US012808666B2

(12) United States Patent
Sugiura et al.

(10) Patent No.: US 12,808,666 B2
(45) Date of Patent: Nov. 24, 2026

(54) SURVEYING INSTRUMENT AND SURVEY SYSTEM

(71) Applicant: TOPCON CORPORATION, Tokyo (JP)

(72) Inventors: Akinobu Sugiura, Tokyo (JP); Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 565 days.

(21) Appl. No.: 18/371,090

(22) Filed: Sep. 21, 2023

(65) Prior Publication Data

US 2024/0110784 A1 Apr. 4, 2024

(30) Foreign Application Priority Data

Sep. 29, 2022 (JP) ................................ 2022-157178
Feb. 27, 2023 (JP) ................................ 2023-028160

(51) Int. Cl.
*G01C 15/00* (2006.01)
*G01S 17/08* (2006.01)
(Continued)

(52) U.S. Cl.
CPC ............ *G01C 15/006* (2013.01); *G01S 17/08* (2013.01); *H04N 23/71* (2023.01); *H04N 23/75* (2023.01)

(58) Field of Classification Search
CPC ....... G01C 15/006; G01S 17/08; G01S 17/66; G01S 7/51; H04N 23/71; H04N 23/75
See application file for complete search history.

(56) References Cited

U.S. PATENT DOCUMENTS

2014/0350886 A1 11/2014 Metzler
2015/0052766 A1* 2/2015 Chiba ..................... G01C 3/00 33/299

(Continued)

FOREIGN PATENT DOCUMENTS

EP 2503284 A2 * 9/2012 ........... G01C 15/002
EP 3842740 A1 * 6/2021 ............... G01C 3/08

(Continued)

OTHER PUBLICATIONS

"An optic to replace space and its application towards ultra-thin imaging systems"—Reshef et al., Nature Communications | (2021) 12:3512 | https://doi.org/10.1038/s41467-021-23358-8 | www.nature.com/naturecommunications (Year: 2021).*

(Continued)

*Primary Examiner* — Mainul Hasan
(74) *Attorney, Agent, or Firm* — Studebaker Brackett PLLC

(57) ABSTRACT

A surveying instrument having a tracking function with a measure against sunlight is provided which includes a tracking unit and a distance-measuring unit, a driving unit, an imaging device, a filter switching device configured to make switching so that either of two filters is selectively disposed on an optical axis of the imaging device, and a control unit configured to, when the imaging device acquires an image including tracking guide light, analyze the image and operate an arrival direction of the tracking guide light, and control the driving unit so that a collimation axis is directed toward the arrival direction of the tracking guide light, wherein one filter of the two filters is a tracking guide light filter configured to transmit only wavelengths in a predetermined range centered on a wavelength of the tracking guide light.

13 Claims, 20 Drawing Sheets

(51) Int. Cl.
*H04N 23/71* (2023.01)
*H04N 23/75* (2023.01)

(56) References Cited

U.S. PATENT DOCUMENTS

| | | | | |
|---|---|---|---|---|
| 2015/0177382 | A1 | 6/2015 | Vogel et al. | |
| 2016/0109560 | A1* | 4/2016 | Yanobe | G01S 7/003 356/4.01 |
| 2019/0063922 | A1* | 2/2019 | Ohtomo | G01C 1/00 |
| 2020/0081266 | A1* | 3/2020 | Ohtomo | G01C 15/006 |
| 2021/0088333 | A1* | 3/2021 | Ishinabe | G01S 17/08 |
| 2022/0252396 | A1 | 8/2022 | Kikuchi | |
| 2024/0110783 | A1 | 4/2024 | Nishita | |

FOREIGN PATENT DOCUMENTS

| | | | |
|---|---|---|---|
| JP | 2009-250836 | A | 10/2009 |
| JP | 2024-050349 | A | 4/2024 |
| WO | 2024/071287 | A1 | 4/2024 |

OTHER PUBLICATIONS

"The opto-mechanical alignment procedure of the VLT Survey Telescope"—Arcidiacono et al., Instrumentation and Methods for Astrophysics; Submitted on Tue, Sep. 14, 2010 10:06:01 UTC (Year: 2010).*

* cited by examiner

First filter (normal filter)

Second filter (tracking guide light filter)

Without filter

With filter (second filter)

Before filter switching (first filter is disposed)

After filter switching (second filter is disposed)

Before filter switching (first filter is disposed)

After filter switching (second filter is disposed)

SURVEYING INSTRUMENT AND SURVEY SYSTEM

TECHNICAL FIELD

The present invention relates to a surveying instrument having a tracking function with a measure against sunlight.

BACKGROUND ART

In a surveying instrument having a tracking function, sunlight enters a field of view for collimation during tracking in some cases. When sunlight enters the field of view for collimation, an overcurrent flows in a light receiving element circuit of the tracking unit, and tracking cannot be performed. In order to avoid this, in Patent Literature 1, a prohibited area is provided at an azimuth and an elevation angle at which sunlight enters, and accordingly, sunlight is blocked.

CITATION LIST

Patent Literature

Patent Literature 1 Japanese Published Unexamined Patent Application No. 2009-250836.

SUMMARY OF INVENTION

Technical Problem

However, although the method described above makes it possible to avoid sunlight, there is a problem in which, for example, when a target enters the prohibited area, the target cannot be tracked.

The present invention was made in view of this problem, and provides a surveying instrument having a tracking function with a measure against sunlight, and a survey system.

Solution to Problem

In order to solve the problem described above, a surveying instrument according to a first aspect of the present invention includes a lens barrel unit storing optical systems of a tracking unit and a distance-measuring unit, a driving unit configured to drive and rotate the lens barrel unit, an imaging device configured to image an image in front of the lens barrel unit, a filter switching device configured to make switching so that either of two filters is selectively disposed on an optical axis of the imaging device, and a control unit configured to, when the imaging device acquires an image including tracking guide light transmitted from an optical transmitter, analyze the image and operate an arrival direction of the tracking guide light, and control the driving unit so that a collimation axis of the lens barrel unit is directed toward the arrival direction of the tracking guide light, wherein one filter of the two filters is a tracking guide light filter configured to transmit only wavelengths in a predetermined range centered on a wavelength of the tracking guide light, and the surveying instrument is configured so that the filter switching device disposes the tracking guide light filter on the optical axis of the imaging device when the imaging device acquires the image.

A surveying instrument according to a second aspect is configured so that, in the first aspect, the tracking guide light is nonvisible light, and the one filter of the two filters is a filter for transmitting only nonvisible light, and the other filter is a filter for transmitting only visible light.

A surveying instrument according to a third aspect is configured so that, in the first or second aspect, during tracking of a target by the tracking unit, when the target is lost, the filter switching device automatically disposes the tracking guide light filter on the optical axis of the imaging device.

In an aspect, during imaging by the imaging device, when the number of saturated pixels included in an acquired image exceeds a predetermined number, the filter switching device disposes the tracking guide light filter on the optical axis of the imaging device.

A surveying instrument according to a fourth aspect is configured so that, in the first to third aspects, when the number of saturated pixels included in an acquired image exceeds a predetermined number during imaging by the imaging device, the filter switching device disposes the tracking guide light filter on the optical axis of the imaging device.

A surveying instrument according to a fifth aspect is configured so that, in the first to fourth aspects, the two filters are provided on the same substrate.

A survey system according to the first aspect of the present invention includes a target unit including an optical transmitter configured to transmit tracking guide light, and a prism, and a surveying instrument including a lens barrel unit storing optical systems of a tracking unit and a distance-measuring unit, a driving unit configured to drive and rotate the lens barrel unit, an imaging device configured to acquire an image of a landscape in front of the lens barrel unit, a filter switching device configured to make switching so that either of two filters is selectively disposed on an optical axis of the imaging device, and a control unit configured to analyze an image including the tracking guide light transmitted from the optical transmitter, imaged by the imaging device, operate an arrival direction of the tracking guide light, and control the driving unit so that a collimation axis of the lens barrel unit is directed toward the arrival direction of the tracking guide light, wherein one filter of the two filters is a tracking guide light filter configured to transmit only wavelengths in a predetermined range centered on a wavelength of the tracking guide light, and the surveying instrument is configured so that the filter switching device disposes the tracking guide light filter on the optical axis of the imaging device when the imaging device acquires an image.

Advantageous Effect of Invention

As is clear from the description above, a surveying instrument having a tracking function with a measure against sunlight, and a survey system, can be provided.

BRIEF DESCRIPTION OF DRAWINGS

FIG. 6A illustrates a state before filter switching. FIG. 6B illustrates a state after filter switching.

FIG. 7A illustrates a transmission range of a first filter. FIG. 7B illustrates a transmission range of a second filter.

FIG. 8A illustrates an image imaged without the filters. FIG. 8B illustrates an image imaged through the second filter. Both of these images are imaged in a direction toward the sun.

FIG. 9A is a side view of the target unit.

FIG. 9B is a plan view of the target unit.

FIG. 12 illustrates a flow of prism lock-on.

FIG. 13 is an image view of a previous process of prism lock-on.

FIG. 14 is an image view of a main process of prism lock-on.

FIG. 19A illustrates a state before filter switching. FIG. 19B illustrates a state after filter switching. These correspond to FIGS. 6A and 6B.

FIG. 20A illustrates a state where a first filter is disposed on an optical axis of the imaging device. FIG. 20B illustrates a state where the second filter is disposed on the optical axis of the imaging device.

DESCRIPTION OF EMBODIMENT

Hereinafter, a detailed embodiment of the present invention will be described with reference to the drawings. The embodiment does not limit the present invention but is just an example, and all features described in the embodiment and combinations thereof are not always essential for the present invention. In the following description of the embodiment and modifications, the same configurations are provided with the same reference signs, and overlapping description will be omitted as appropriate.

(Survey System)

Figure 1:
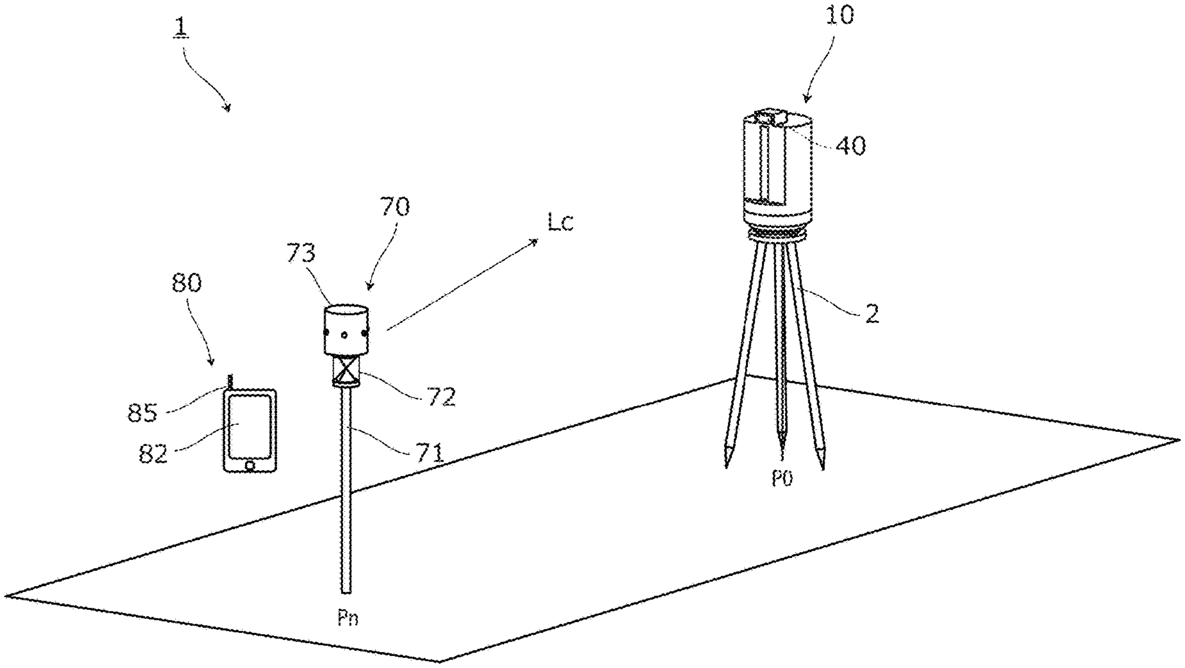
FIG. 1 is a view illustrating a general configuration of a survey system including a surveying instrument according to a preferred embodiment of the present invention.

FIG. 1 is a view illustrating a general configuration of a survey system 1 including a surveying instrument 10 according to a preferred embodiment of the present invention.

The survey system 1 includes the surveying instrument 10, a target unit 70, and a controller 80.

The surveying instrument 10 is a total station having a distance/angle-measuring function and a tracking function. Further, the surveying instrument 10 also includes an imaging unit 40 that acquires an image in front of the surveying instrument 10.

The target unit 70 includes an all-around reflection prism 72 as a target of the surveying instrument 10 at an upper end of a pole 71, and is used by setting a lower end of the pole 71 substantially vertically at a measurement point.

The target unit 70 includes an optical transmitter 73. The optical transmitter 73 transmits tracking guide light Lc of infrared light all around in the horizontal direction when lock-on (tracking) of the prism 72 by the surveying instrument 10 is lost. The tracking guide light Lc is captured by the imaging unit 40 of the surveying instrument 10 and an arrival direction is analyzed, and the prism 72 is locked on again (collimation), and accordingly, tracking can be quickly restarted.

When searching for the prism 72, a filter that mainly transmits only the tracking guide light Lc is disposed on the optical axis of the imaging unit 40, so that saturation caused by sunlight can be prevented.

The controller 80 is a controller to remotely operate the surveying instrument 10. In the present embodiment, the optical transmitter 73 of the target unit 70 is also operated by the controller 80. An operator carries the controller 80 with him/her together with the target unit 70 during a survey work by wearing the controller 80 on his/her arm or attaching the controller to the target unit 70.

The controller 80 is provided with a touch panel type display unit 82, and position information of the controller itself and measurement points, etc., are displayed in real time. The operator can operate the surveying instrument 10 by inputting a command as appropriate while confirming information on the display unit 82. An image imaged by the surveying instrument 10 can also be displayed on the display unit 82.

The controller 80 is equipped with a GPS device 85, and by the GPS device 85, a positional relationship between the operator who holds the controller 80 and the prism 72, and the surveying instrument 10 is generally grasped. In addition, even when tracking by the surveying instrument 10 is lost, the surveying instrument 10 grasps a rough direction of the prism 72 by the GPS device 85, so that tracking can be quickly restarted.

(Surveying Instrument)

Figure 2:
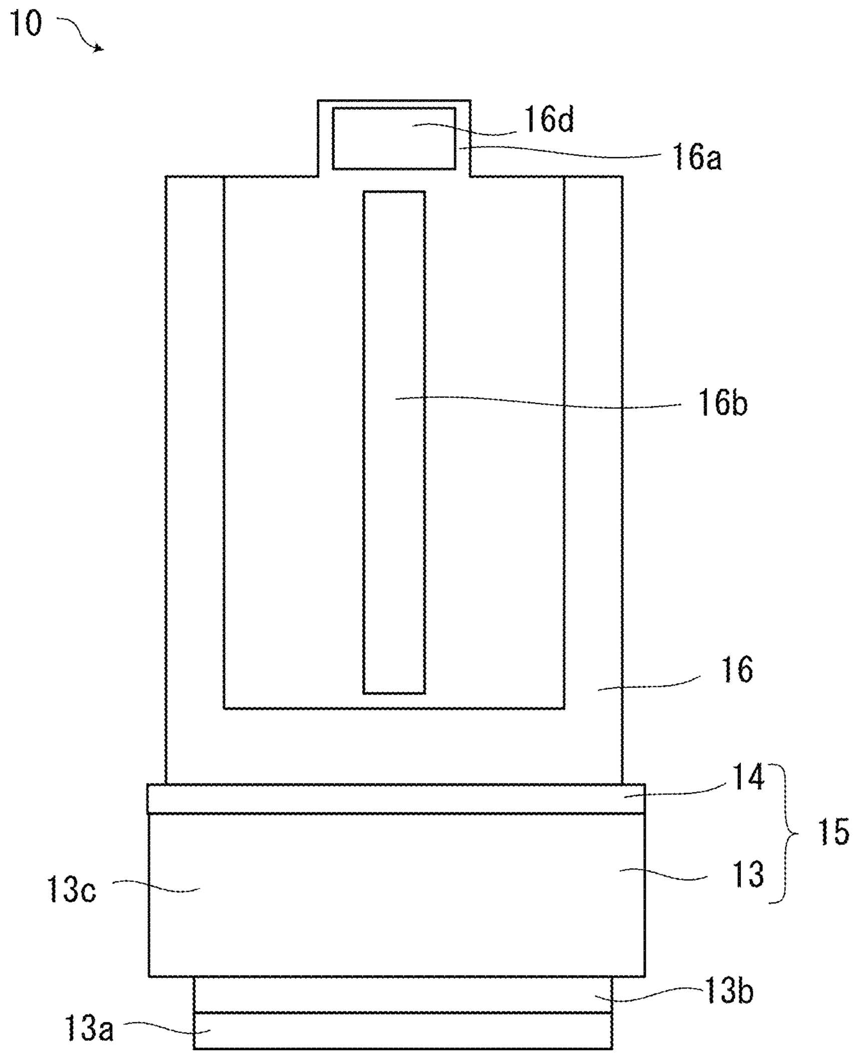
FIG. 2 is a front view of the surveying instrument.
Figure 3:
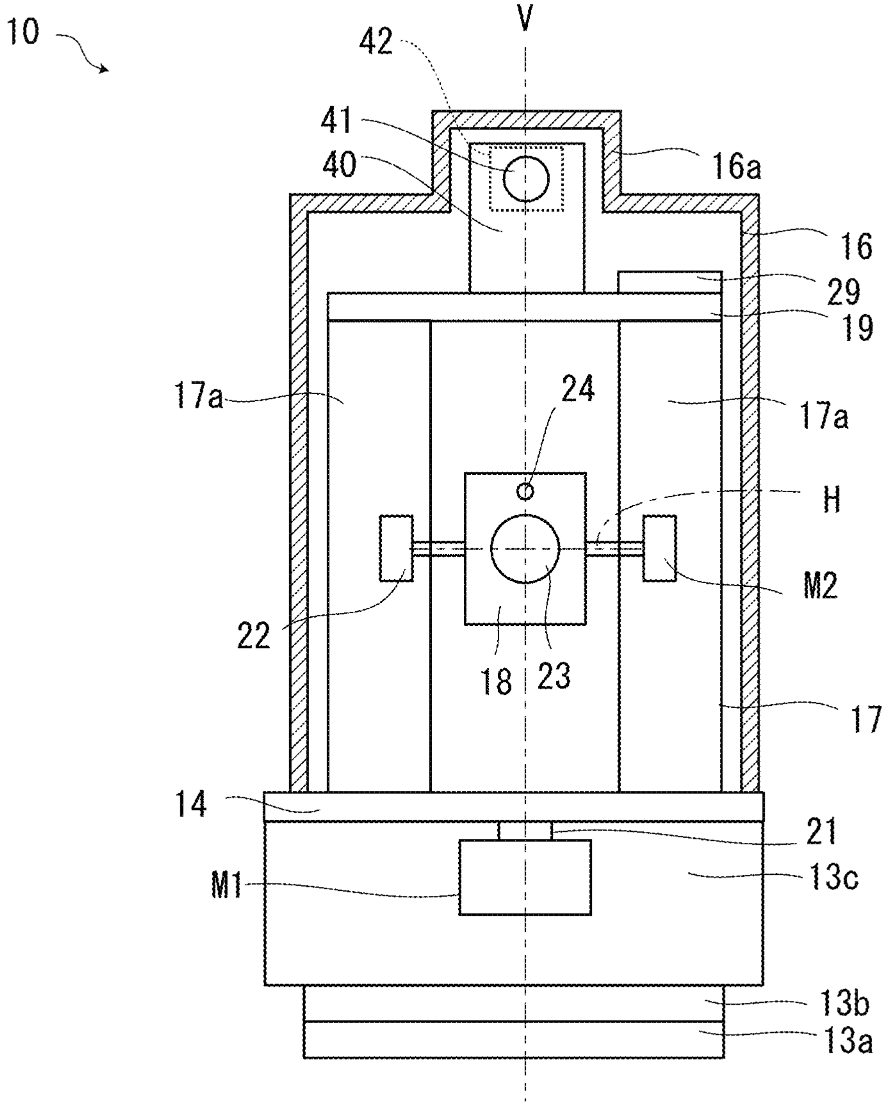
FIG. 3 is a schematic view schematically illustrating an internal structure of the surveying instrument.

The surveying instrument 10 will be described with reference to FIGS. 2 to 4. FIG. 2 is a front view of the surveying instrument 10. FIG. 3 is a schematic view schematically illustrating an internal structure of the surveying instrument 10.

As illustrated in FIGS. 2 and 3, the surveying instrument 10 includes a surveying instrument main body 15 consisting of a base portion 13 and a rotary base 14 to be rotated in the horizontal direction with respect to the rotary base 14, and a cover member 16.

The base portion 13 substantially consists of a fixed seat 13*a* to be fixed to a tripod 2, a leveling base 13*b* having a leveling screw (not illustrated), and a case 13*c* in which driving mechanisms such as a horizontal rotation driving unit M1 that drives and rotates the rotary base 14 in the horizontal direction around a vertical axis V are incorporated.

On the rotary base 14, a bracket portion 17 consisting of a pair of support members 17*a* is erected. Between the pair of support members, a lens barrel unit 18 of a distance-measuring optical system and a tracking optical system is disposed. The lens barrel unit 18 is supported in a vertically rotatable manner by a horizontal shaft H provided in the bracket portion 17.

To one end portion of the horizontal shaft H, a vertical rotation driving unit M2 that drives and rotates the lens barrel unit 18 in the vertical direction is fixed, and at the other end portion, a vertical angle detector 22 for detecting a rotation angle of the lens barrel unit 18 is provided.

To an upper end portion of the bracket portion 17, a thin horizontal plate 19 disposed horizontally across the pair of support members is fixed. To an upper surface of the horizontal plate 19, a surveying instrument control unit 29 and an imaging unit 40 are attached.

The surveying instrument control unit 29 uses a control circuit board as a base and is disposed at an upper portion of the right bracket portion 17.

The cover member 16 has a projecting portion 16*a* projecting from an upper surface, and a front surface of the projecting portion 16*a* is flush with a front surface of the cover member 16. The imaging unit 40 is disposed at a center of the horizontal plate 19 inside the projecting portion 16*a*.

In the front surface of the cover member 16, two windows are provided including an imaging window 16*d* provided in the front surface of the projecting portion 16*a*, and a lens barrel window 16*b* extending in the up-down direction at the center of the front surface.

The lens barrel window 16*b* is formed on an optical axis of the lens barrel unit 18, and transmits infrared laser light of optical systems of a distance-measuring unit 23 and a tracking unit 24 housed in the lens barrel unit 18. The imaging window 16*d* is formed in front of the imaging unit 40, and the imaging unit 40 acquires an image in front of the surveying instrument 10 through the imaging window 16*d*.

When the lens barrel window 16*b* is orthogonal to an optical axis of the infrared laser light, the infrared laser light reflected by the lens barrel window 16*b* directly returns and harmfully influences distance and angle measurements, and in order to avoid this, the lens barrel window 16*b* is not orthogonal to the optical axis of the infrared laser light but is slightly inclined in the horizontal direction to prevent an error caused by reflection.

At a contact point between the rotary base 14 and the cover member 16, a sealing member (not illustrated) to prevent infiltration of rainwater, etc., is provided.

A gap is provided between the cover member 16 and the imaging unit 40 and lens barrel unit 18. Accordingly, at the time of attachment and detachment of the cover member 16, the cover member 16 can be prevented from coming into contact with the imaging unit 40 and the lens barrel unit 18. The cover member 16 covers the imaging unit 40 and the lens barrel unit 18 while being away from these, and even after the cover member 16 is detached, the respective optical axes do not need to be adjusted.

(Block Diagram)

Figure 4:
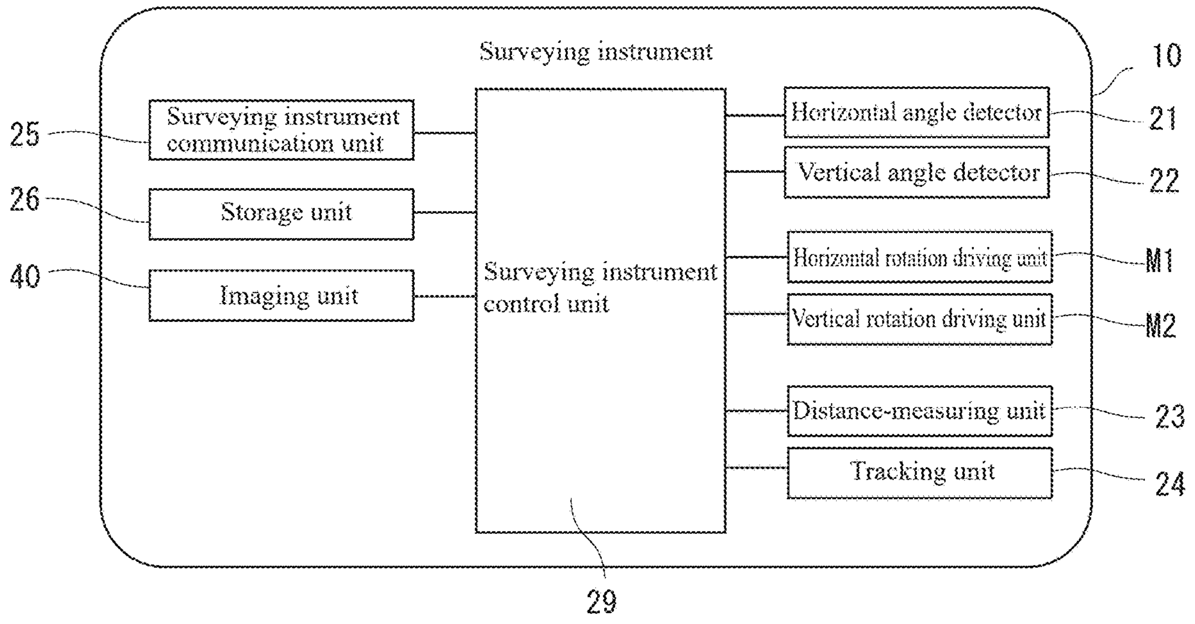
FIG. 4 is a block diagram of the surveying instrument.

FIG. 4 is a control block diagram of the surveying instrument 10. The surveying instrument 10 includes a horizontal angle detector 21, the vertical angle detector 22, the horizontal rotation driving unit M1, the vertical rotation driving unit M2, the distance-measuring unit 23, the tracking unit 24, a surveying instrument communication unit 25, a storage unit 26, the imaging unit 40, and the surveying instrument control unit 29 to which all of these components are connected.

The horizontal angle detector 21 and the vertical angle detector 22 are absolute encoders or incremental encoders including a rotary disc, a slit, a light emitting diode, and an image sensor. The horizontal angle detector 21 is provided on a rotary shaft of the rotary base 14, and detects a horizontal angle of the rotary base 14. The vertical angle detector 22 is provided on the horizontal shaft H of the lens barrel unit 18, and detects a vertical angle of the lens barrel unit 18.

The horizontal rotation driving unit M1 and the vertical rotation driving unit M2 are motors. These are controlled by the surveying instrument control unit 29, and the horizontal rotation driving unit M1 drives the rotary shaft of the rotary base 14, and the vertical rotation driving unit M2 drives the horizontal shaft H of the lens barrel unit 18. The direction of the lens barrel unit 18 is changed by cooperation of both driving units. The horizontal angle detector 21 and the vertical angle detector 22 constitute an angle-measuring unit. The horizontal rotation driving unit M1 and the vertical rotation driving unit M2 constitute a driving unit.

The distance-measuring unit 23 includes a light transmitting unit including a light source that emits distance-measuring light, and a light receiving unit, and is collimated to the all-around reflection prism 72 as a target, emits distance-measuring light, for example, infrared laser light or the like to the prism 72 and receives reflected light of the distance-measuring light to measure a distance from phases of the distance-measuring light and internal reference light.

The tracking unit 24 includes a tracking light transmitting system including a light source that emits, as tracking light, infrared laser light or the like of a wavelength different from a wavelength of the distance-measuring light, and a tracking light receiving system including an image sensor such as a CCD sensor or a CMOS sensor. The tracking unit 24 acquires a landscape image including the tracking light and a landscape image not including the tracking light, and transmits the images to the surveying instrument control unit 29. The surveying instrument control unit 29 obtains a center of a target image from a difference between the images and detects the center as a target position, and performs automatic tracking by always directing the lens barrel unit 18 toward the target so that a deviation between the center of the target image and a collimation axis center of the lens barrel unit 18 falls within a certain value.

The surveying instrument communication unit 25 enables communication with an external network, and for example, connects to the internet by using an internet protocol (TCP/IP) and transmits and receives information to and from the target unit 70 and the controller 80. Without limitation to this, known wireless communication can be used. Measurement results acquired by making measurements (distance and angle measurements) by the surveying instrument 10 are transmitted to the controller 80 through the surveying instrument communication unit 25. The input unit of the surveying instrument 10 is an input unit of the controller 80, so that a command input from the controller 80 is also input into the surveying instrument control unit 29 through the surveying instrument communication unit 25. Images acquired by the imaging unit 40 are also transmitted to the controller 80 through the surveying instrument communication unit 25.

The surveying instrument control unit 29 is a microcontroller configured by mounting, for example, a CPU, a ROM, and a RAM, etc., on an integrated circuit, and all devices of the surveying instrument 10 are connected to the surveying instrument control unit 29, and the surveying instrument control unit 29 controls these devices. For example, the surveying instrument control unit 29 controls the horizontal rotation driving unit M1 and the vertical rotation driving unit M2, light emission of the distance-measuring unit 23 and the tracking unit 24, automatic tracking, automatic collimation, and distance and angle measurements of the prism 72, turning ON/OFF of the imaging unit 40 and filter switching, and transmission and reception of measurement data and commands through the surveying instrument communication unit 25, etc. When tracking is lost, the surveying instrument control unit 29 transmits a notification of this to the controller 80 and the target unit.

The storage unit 26 is a storage medium, for example, a hard disc drive or the like, and programs for the arithmetic controls described above are stored therein. Acquired measurement data are also stored.

(Imaging Unit)

Figure 5:
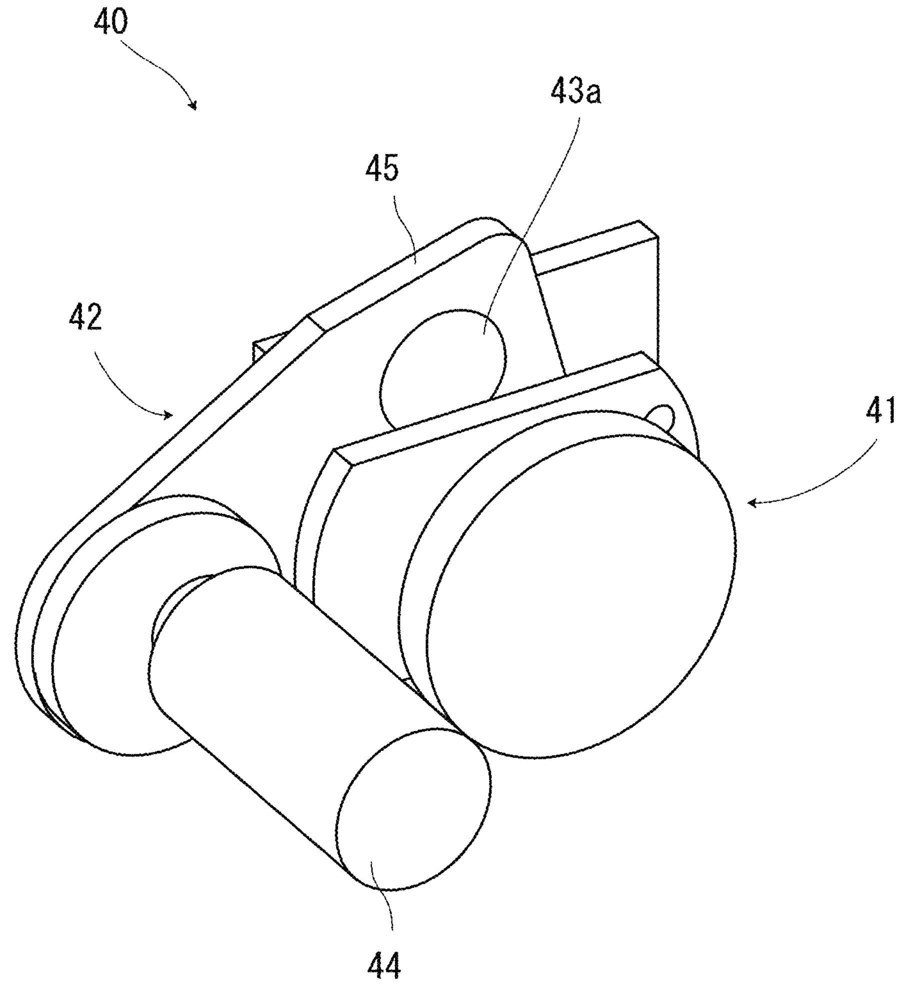
FIG. 5 is a perspective view of an imaging unit.

Next, the imaging unit 40 will be described with reference to FIGS. 5, 6A, and 6B. FIG. 5 is a perspective view of the imaging unit 40.

The imaging unit 40 includes an imaging device 41 and the filter switching device 42. The imaging device 41 includes an image pickup device such as a CCD or CMOS, and can acquire a moving image in real time. The imaging device 41 of the present embodiment is a so-called wide camera with a wide angle of view. The imaging device 41 is disposed above the lens barrel unit 18 so that their optical axes coincide with each other in the horizontal direction, and images a landscape in front of the lens barrel unit 18. A landscape imaged by the imaging device 41 is transmitted to the controller 80 through the surveying instrument communication unit 25, and displayed on the display unit 82. In the survey system 1, it is assumed that one operator performs a survey work (one-person operated work), and an operator at a distance from the surveying instrument 10 can confirm a state in front of the surveying instrument 10 in real time by the image imaged by the imaging device 41.

Figure 6A:
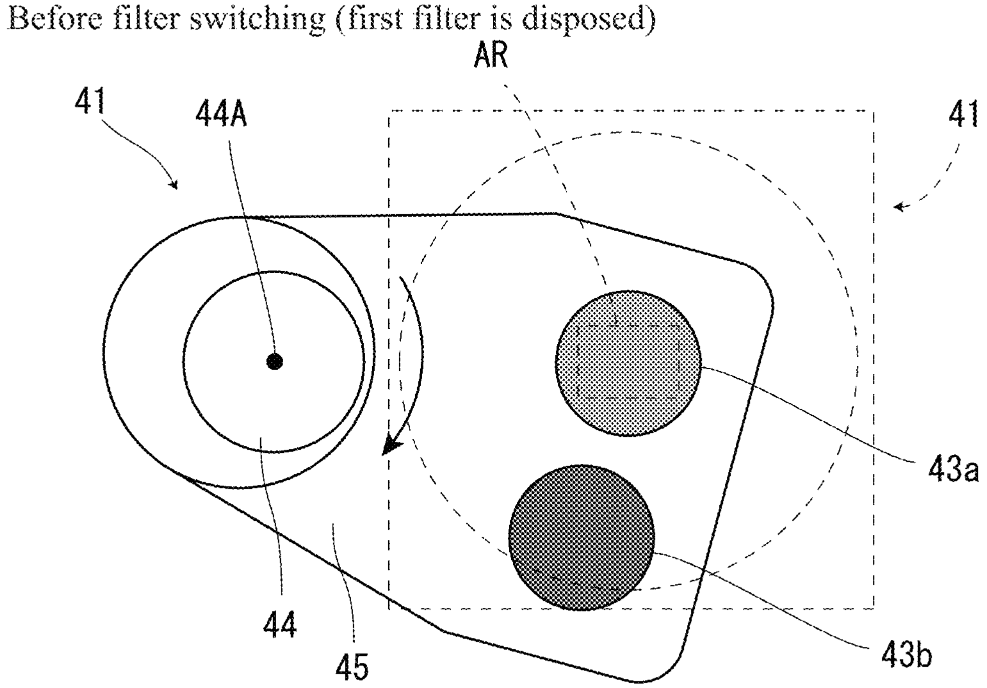
FIGS. 6A and 6B are front views of a filter switching device.
Figure 6B:
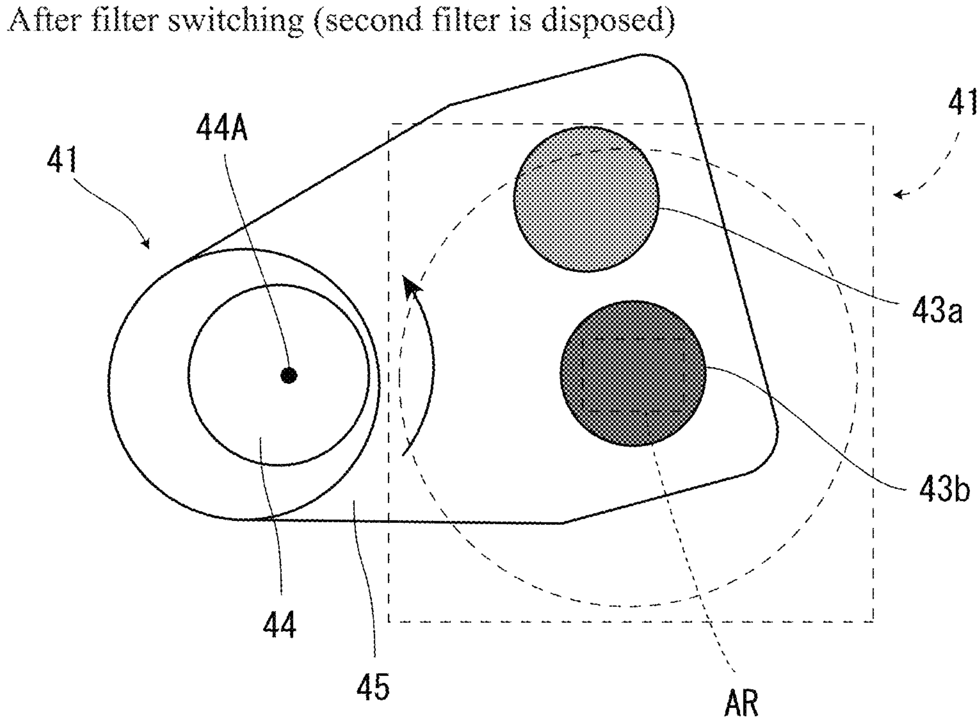

FIGS. 6A and 6B are front views of the filter switching device 42. FIG. 6A illustrates a state before filter switching, and FIG. 6B illustrates a state after filter switching. In FIGS. 6A and 6B, for description, two filters are colored in different colors. FIGS. 6A and 6B are views from the optical axis direction of the imaging device 41, and illustrate the imaging device 41 and the light receiving element AR (image pickup device region) of the imaging device 41 together.

The filter switching device 42 includes a first filter 43*a* and a second filter 43*b* to be selectively disposed on an imaging (light reception) optical axis of the imaging device 41. The first filter 43*a* and the second filter 43*b* are optical elements that transmit only light in a specific wavelength range of incident light, and do not transmit other light.

To two openings provided in a base body 45 formed of a thin plate, the first filter 43*a* and the second filter 43*b* are attached. The base body 45 is joined to a solenoid 44 and supported turnably, and is disposed on the optical axis of the imaging device 41 in front of the light receiving element AR so as to cover the light receiving element AR. Light incident on the imaging device 41 passes through either the first filter 43*a* or the second filter 43*b* and is received by the light receiving element AR.

As illustrated in FIG. 6A, in a state where the solenoid 44 is not energized, the first filter 43*a* is disposed on the optical axis of the imaging device 41 in front of the light receiving element AR so as to cover the light receiving element AR.

By energizing the solenoid 44, the base body 45 joined to the solenoid 44 is driven to rotate by a predetermined angle around a central axis 44A, and accordingly, the filter disposed on the optical axis of the imaging device 41 is switched to the second filter 43*b*.

Figure 7A:
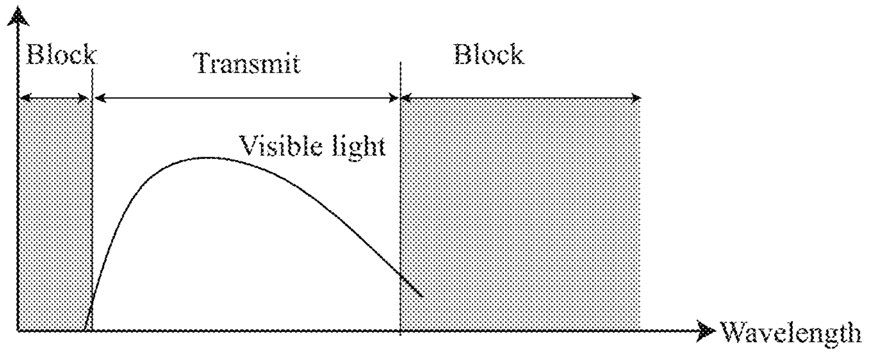
FIGS. 7A and 7B are explanatory diagrams of wavelength ranges that filters transmit.
Figure 7B:
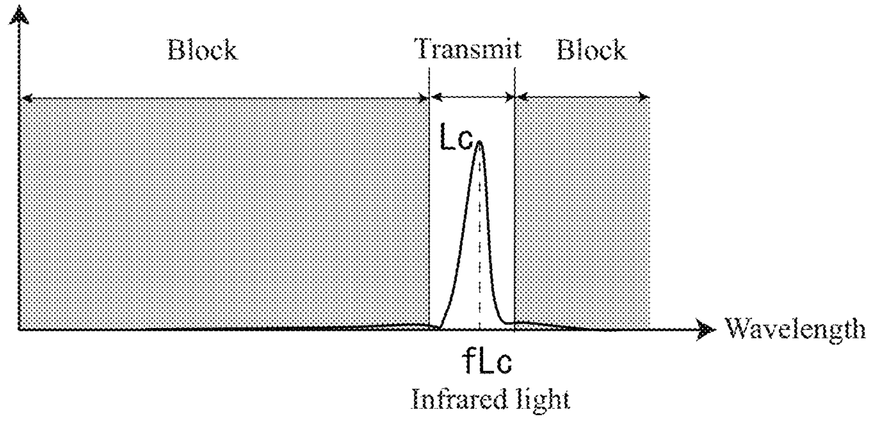

FIGS. 7A and 7B are explanatory diagrams concerning wavelength ranges that the first filter 43*a* and the second filter 43*b* transmit. FIG. 7A illustrates a transmission range of the first filter 43*a*. FIG. 7B illustrates a transmission range of the second filter 43*b*.

The first filter 43*a* is a normal filter to be mainly used when imaging a landscape in front of the surveying instrument 10. The first filter 43*a* transmits light in a visible light range, and blocks other light.

The second filter 43*b* is a tracking guide light filter for receiving tracking guide light Lc transmitted from the optical transmitter 73. Therefore, the second filter 43*b* transmits only light of wavelengths in a range centered on and set around a wavelength fLc of the tracking guide light Lc of infrared light, and blocks light of other wavelengths.

Normally, when imaging the front of the surveying instrument 10, the first filter 43*a* is disposed on the optical axis of the imaging device 41. When tracking by the tracking unit 24 of the surveying instrument 10 is lost, power is fed to the solenoid 44 and the base body 45 is driven to rotate and the filter switches, and the second filter 43*b* is disposed on the optical axis of the imaging device 41.

The imaging device 41 images an image including the tracking guide light Lc transmitted from the optical transmitter 73, and the surveying instrument control unit 29 analyzes a position of the tracking guide light Lc in the image. Then, the surveying instrument control unit 29 drives the horizontal rotation driving unit M1 so that the tracking guide light Lc comes to a center of the image in the horizontal direction, that is, the optical axis of the lens barrel unit 18 coincides with an arrival direction of the tracking guide light in the horizontal direction. The second filter 43*b* blocks light of wavelengths other than the wavelength of the tracking guide light Lc, and the imaging device 41 has a wide angle of view and a wide imaging range, and this configuration makes it easy to acquire an image including the tracking guide light Lc and detect the tracking guide light Lc. In addition, even in a normal state, the first filter 43*a* blocks light other than visible light, so that saturation caused by sunlight can be suppressed.

The filter switching device 42 is configured to automatically dispose the second filter 43*b* on the optical axis of the imaging device 41 when tracking is lost. In addition, during imaging by the imaging device 41 by using the first filter 43*a*, when the number of saturated pixels included in an acquired image exceeds a predetermined number, the filter switching device 42 disposes the second filter 43*b* on the optical axis of the imaging device 41. Accordingly, this make it possible to prevent the imaged image from being saturated and turning white and becoming unidentifiable.

Figure 8A:
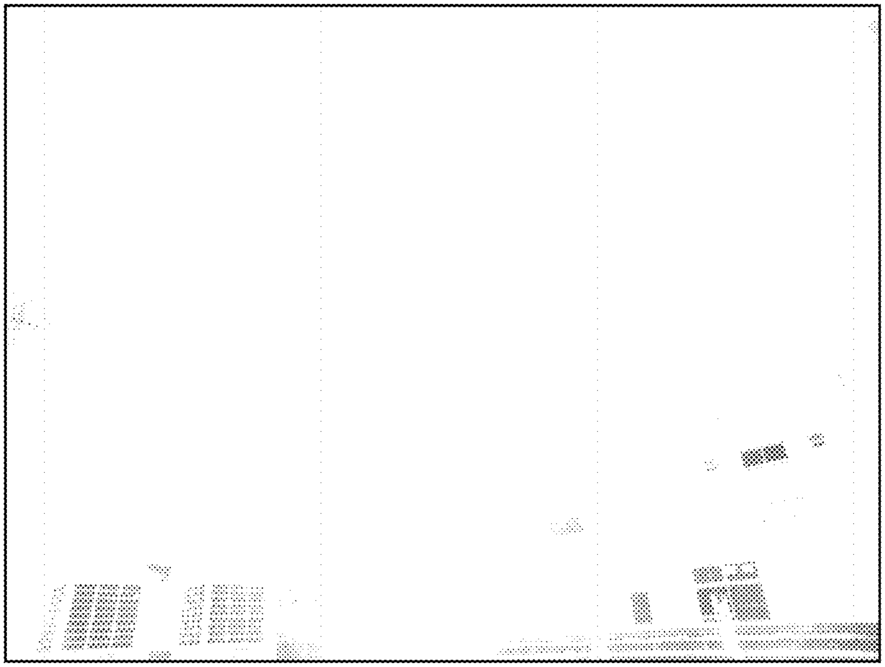
FIGS. 8A and 8B illustrate images indicating an effect of the filter switching device.
Figure 8B:
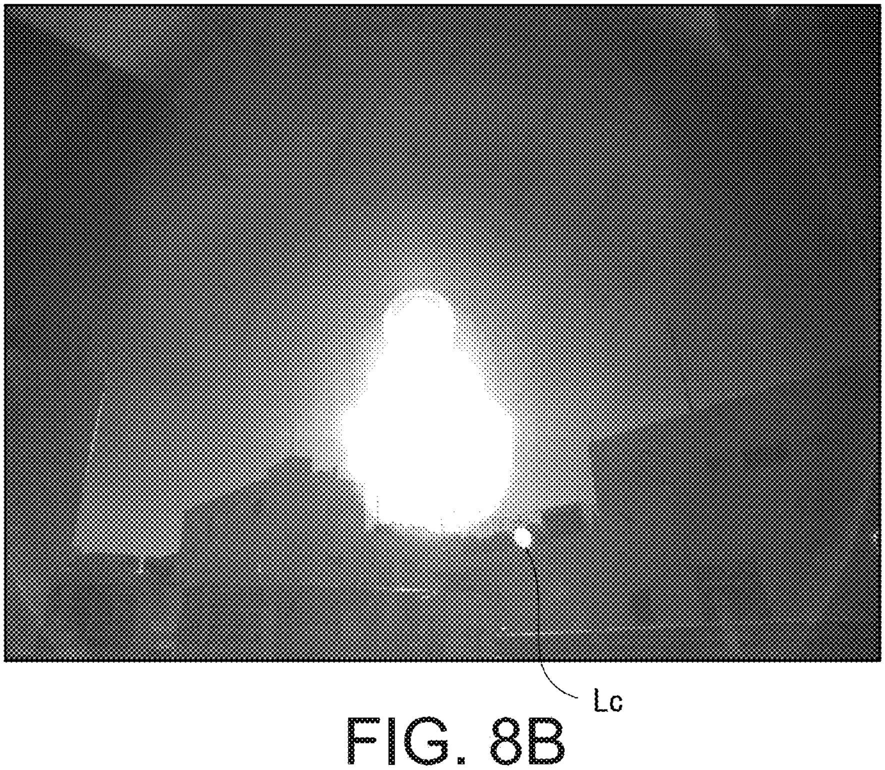

FIGS. 8A and 8B are comparison views for describing the effect of the filters. FIG. 8A illustrates an image imaged without the filters. FIG. 8B illustrates an image imaged through the second filter 43*b*. Both images are imaged in the direction of the sun.

As illustrated in FIG. 8A, when the direction of the sun is imaged without the filters, sunlight enters the image and the entire image turns white. The imaging unit 40 performs exposure correction and sensitivity correction by automatically setting an aperture and a shutter speed to proper values. However, the sunlight is excessively strong and proper imaging cannot be performed, and neither the tracking guide light Lc nor an object can be identified.

On the other hand, as illustrated in FIG. 8B, by transmitting only wavelengths in the predetermined range around the wavelength of the tracking guide light Lc through the second filter 43*b*, an image in which the tracking guide light Lc can be identified is acquired. Thus, when performing searching to start or restart tracking, by switching to the second filter 43*b*, the influence of entrance of the sunlight into the field of view can be suppressed.

In a case where the surveying instrument 10 starts or restarts tracking while the first filter 43*a* is left disposed, when sunlight is in the imaging range of the imaging device 41, the sunlight enters an acquired image and the amount of light received by the light receiving element AR of the imaging device 41 reaches a limit value, and a saturation (saturated) state occurs. In the saturated state, the tracking guide light Lc transmitted from the optical transmitter 73 cannot be identified, and searching for tracking cannot be performed. When tracking is lost, the second filter 43*b* is disposed on the optical axis of the imaging device 41 by the filter switching device 42, and by transmitting only light in the wavelength range of the tracking guide light Lc of the optical transmitter 73 and blocking light of other wavelengths, the tracking guide light Lc can be detected even when the sunlight enters the field of view. Accordingly, the influence of reflection of the sunlight can be suppressed, the direction of the tracking guide light Lc can be detected, and prism searching can be continued.

It is also possible that nonvisible light is used as the tracking guide light Lc, and the second filter 43*b* is configured to transmit only visible light, and the first filter 43*a* is configured to transmit only nonvisible light.

The mechanism for switching the two filters is not limited to the above-described mechanism, and the driving mechanism is not limited to the solenoid. Conventionally known configurations such as motors, air cylinders, pinions or the like may also be used without any problem.

(Target Unit)

Figure 9A:
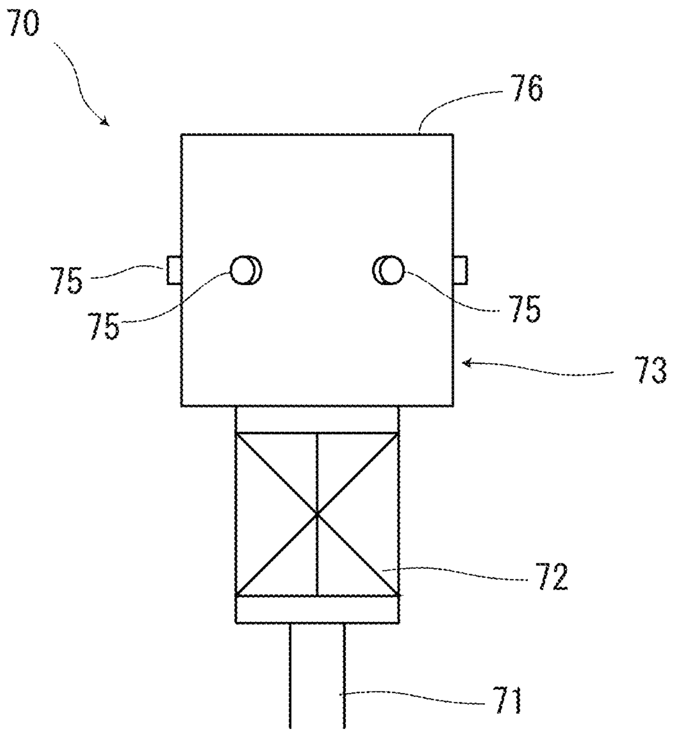
FIGS. 9A and 9B illustrate a target unit.
Figure 9B:
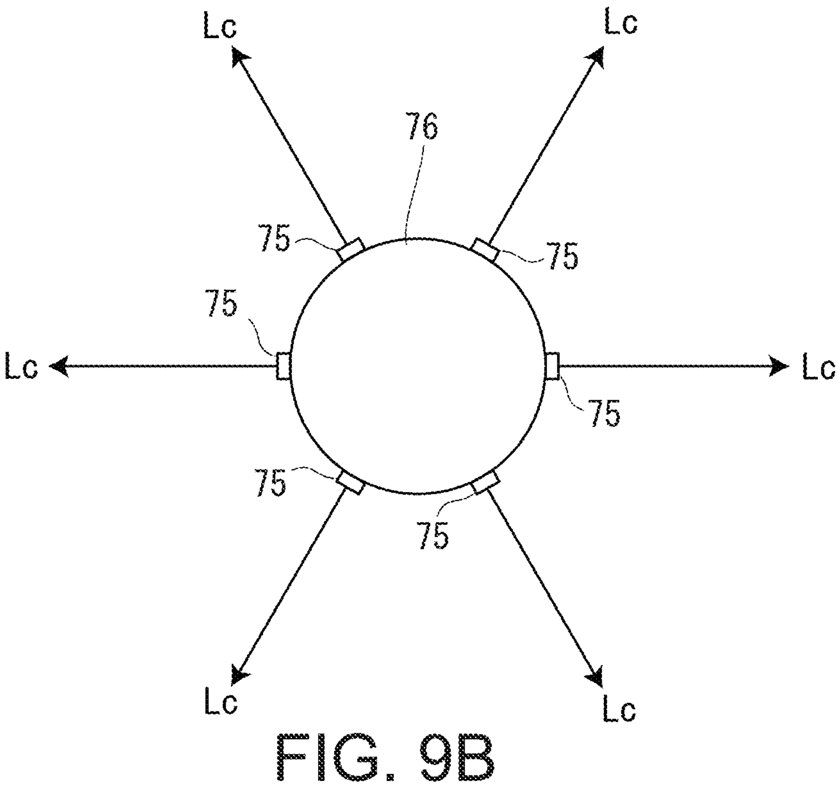

Next, the target unit 70 will be described with reference to FIGS. 9A and 9B. FIGS. 9A and 9B illustrate the target unit 70. FIG. 9A is a side view of the target unit 70, and FIG. 9B is a plan view of the target unit 70. Refer to the perspective view of the target unit 70 in FIG. 1 as well.

As illustrated in FIGS. 9A and 9B, the target unit 70 includes the prism 72 attached to an upper end of the pole 71. An optical center of the prism 72 passes through the central axis of the pole 71, and a distance from the optical center of the prism 72 to a lower end of the pole 71 (attaching height) is known.

Further, on an upper portion of the prism 72, the optical transmitter 73 including a columnar-shaped housing 76 is attached so that a central axis of the housing 76 coincides with the central axis of the pole 71.

The optical transmitter 73 transmits tracking guide light Lc. Light transmitted from the optical transmitter 73 is tracking guide light Lc, and is infrared light of a wavelength different from wavelengths of distance-measuring light and tracking light. The imaging unit 40 images an image including the transmitted tracking guide light Lc, the image is subjected to an image analysis and a position of the tracking guide light Lc is analyzed by the surveying instrument control unit 29, the horizontal rotation driving unit M1 and the vertical rotation driving unit M2 are driven to direct the collimation direction toward an arrival direction of the tracking guide light Lc, and accordingly, the direction of the lens barrel unit 18 is changed. As an image analysis method, a known method may be used, and description thereof is omitted.

In an outer circumferential surface of the housing 76, a plurality (six in the present embodiment) of light transmission ports 75 for the tracking guide light Lc are provided at even angles around the central axis of the pole 71 on the same horizontal plane. From the plurality of light transmission ports 75, infrared lights of the same wavelength are emitted outward as tracking guide light Lc.

Upon reception of a command from the controller 80, the optical transmitter 73 transmits tracking guide light Lc from all light transmission ports 75. Accordingly, the tracking guide light Lc is transmitted outward all around in the horizontal direction from the housing 76. The tracking guide light Lc is infrared light, so that the operator does not visually recognize it.

Conventionally, when tracking was lost, in order to transmit tracking guide light to the surveying instrument, an operator had to direct the optical transmitter toward the surveying instrument and press a switch, so that the operator had to interrupt the work and perform a light transmitting operation. On the other hand, the optical transmitter 73 transmits the tracking guide light Lc all around from the plurality of light transmission ports 75, and in addition, the surveying instrument 10 receives the tracking guide light Lc by a wide camera having a wide angle of view, so that the operator does not have to perform the action to direct the optical transmitter toward the surveying instrument. The controller 80 is configured to automatically command the optical transmitter 73 to transmit the tracking guide light Lc when tracking by the surveying instrument 10 is lost, so that the operator does not have to perform the action for transmitting the tracking guide light Lc.

(Controller 80)

Figure 10:
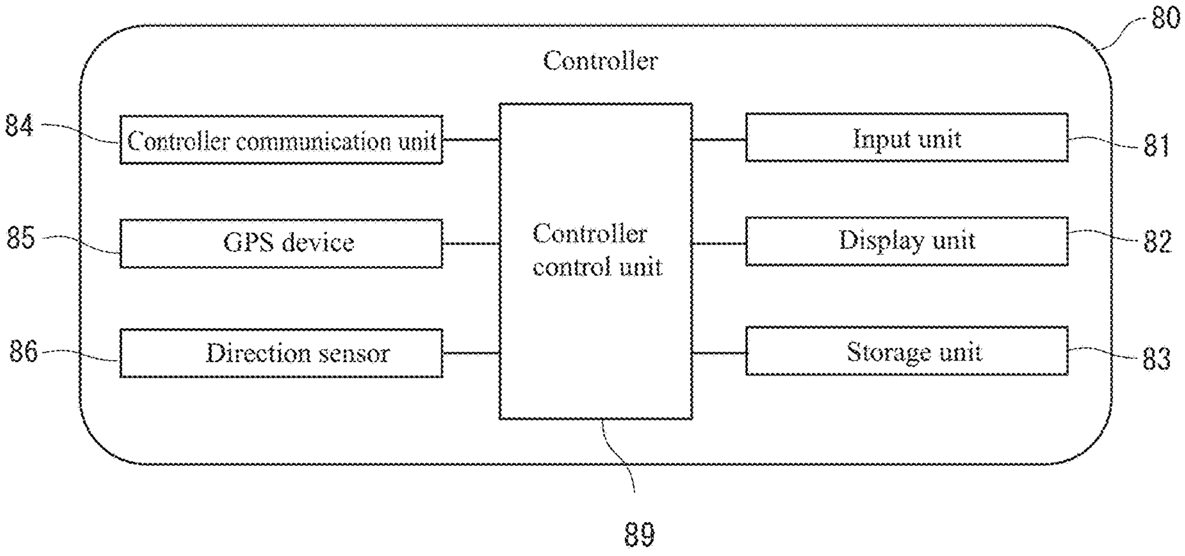
FIG. 10 is a block diagram of a controller.

FIG. 10 is a block diagram of the controller 80. The controller 80 is an operation terminal that remotely operates the surveying instrument 10. Further, the controller 80 is also configured to command the optical transmitter 73 to transmit the tracking guide light Lc.

As illustrated in FIG. 10, the controller 80 includes an input unit 81, the display unit 82, a storage unit 83, a controller communication unit 84, the GPS device 85, a direction sensor 86, and a controller control unit 89.

The input unit 81 and the display unit 82 are interfaces of the controller 80. An operator can operate the surveying instrument 10 and input information from the input unit 81. In the present embodiment, the display unit 82 is a touch panel type liquid crystal screen, and is integrated with the input unit 81.

The controller communication unit 84 has a configuration equivalent to that of the surveying instrument communication unit 25, and can transmit and receive information to and from the surveying instrument 10. Commands are also transmitted from the controller communication unit 84 to the optical transmitter 73.

The GPS device 85 is a device that receives a GPS signal transmitted from a GPS satellite, and from a received GPS signal, a current position is grasped. In the present embodiment, as the GPS device 85, a device capable of performing only single positioning can be used without any problem.

The direction sensor 86 is an electronic compass using a semiconductor. The direction sensor 86 calculates a direction by detecting earth's south-north magnetism. A publicly known electronic compass using an MR device (Magneto Resistive Sensor) or using a GMR device (Giant Magneto Resistive Sensor), etc., can be used, and its type is not limited.

In the present embodiment, as the controller 80, a smartphone, a tablet, or the like is assumed to be used, and a GPS device, an electronic compass, or a triaxial gyro originally equipped in these may be used.

By the GPS device 85 equipped in the controller 80, a positional relationship between the controller 80 and the surveying instrument 10 is generally grasped (described later). The operator moves while holding the controller 80 and the target unit 70, so that a positional relationship between the surveying instrument 10 and the prism 72 is also generally grasped. Even when tracking by the surveying instrument 10 is lost, the surveying instrument 10 can grasp a rough direction of the prism 72 by the GPS device 85, and by directing the lens barrel unit 18 toward the GPS device 85 in the horizontal direction and then performing scanning in the vertical direction by the lens barrel unit 18, the prism 72 can be quickly locked on again.

Figure 11:
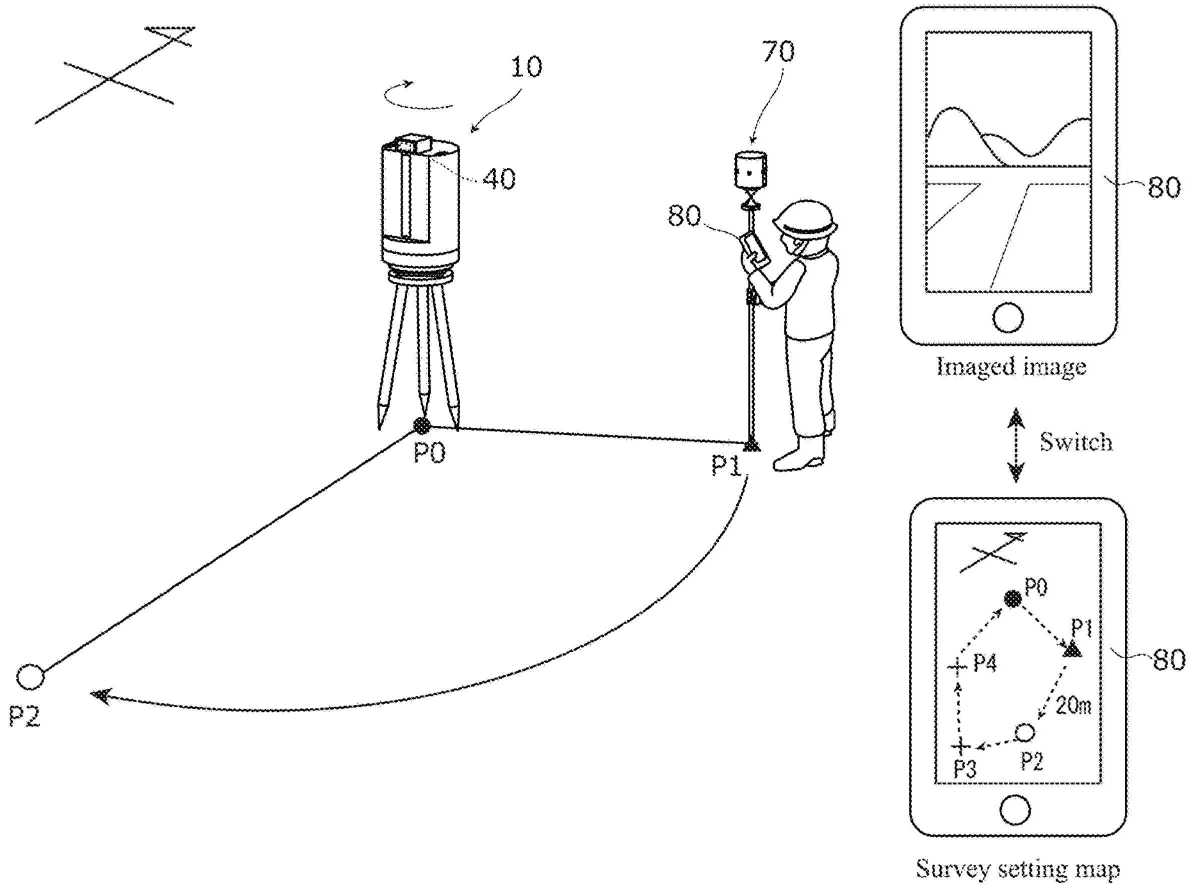
FIG. 11 illustrates an explanatory view of a survey work and a display screen.

FIG. 11 illustrates an explanatory view of a survey work, and a display screen of the controller 80. In the storage unit 83, for example, input survey data (design data) is stored. The display unit 82 has a function of displaying a survey setting map corresponding to measurement data. The controller control unit 89 has a function of configuring a map to be displayed on the screen of the display unit 82 based on position information of the GPS device 85, a direction signal of the direction sensor 86 and design data.

The controller control unit 89 has a current position of the surveying instrument 10 and design data of measurement points P1, P2, P3 . . . Pn, so that the controller control unit 89 can operate a horizontal direction turning angle with respect to each measurement point. The controller control unit 89 has a function of sending a command to the surveying instrument 10 through the controller communication unit 84 and driving the horizontal rotation driving unit M1 to turn the lens barrel unit 18 in a horizontal direction of a measurement point Pn.

An image imaged by the imaging unit 40 is also displayed on the display unit 82. A configuration is made to enable automatic or manual switching between a video image imaged by the imaging unit 40 and the survey setting map to be displayed on the display unit 82. For example, a distance between a current position of the operator and a measurement point Pn becomes a certain distance, for example, 5 m or less, the display image is automatically switched from the display of the survey setting map to an image imaged by the imaging unit 40.

It is also possible that a command to move a visual point of an image to be imaged by the imaging unit 40 to either the left or the right of a current visual point is issued by the input unit 81. For example, a configuration is made in which, when an operator wants to move the visual point to the right of a current image and see the image, by flicking the display unit 82 rightward, the horizontal rotation driving unit M1 of the surveying instrument 10 is turned to the right to turn the rotary base 14 to the right, and accordingly, the imaging unit 40 is directed rightward from the current position so as to image the right side from the current position.

The controller control unit 89 causes the display unit 82 to display a direction as a compass based on direction data acquired by the direction sensor 86. Further, the controller control unit 89 has a function of causing the display unit 82 to display a distance and a direction from a current position of the operator to a next measurement point and a function of causing the display unit 82 to display a direction of movement by operating the distance and angles from the current position (measurement point Pn) of the operator obtained by distance and angle measurements by the surveying instrument 10 to the next measurement point Pn+1.

The operator measures the measurement points P1, P2, P3 . . . in order according to the display made based on survey setting data.

(Prism Lock-On Function)

The surveying instrument 10 has a function (prism lock-on function) of automatically finding the prism and being locked on to and track the prism when starting tracking of the prism 72 by the tracking unit 24 or when tracking is lost. In the conventional prism lock-on function, collimation light is emitted from a lens barrel, and by repeatedly turning the lens barrel up and down while rotating it in the horizontal direction, scanning is performed in all directions by the collimation light, and by receiving reflected light, a prism is found and collimation is performed. However, scanning is performed in a state where the location of the prism is not known at all, and scanning is performed in all directions, so that it takes time to find the prism. In the present embodiment, the surveying instrument 10 is directed toward a rough direction first, and then scanning is performed in an accurate direction, and accordingly, the prism 72 can be quickly locked on.

Figure 12:
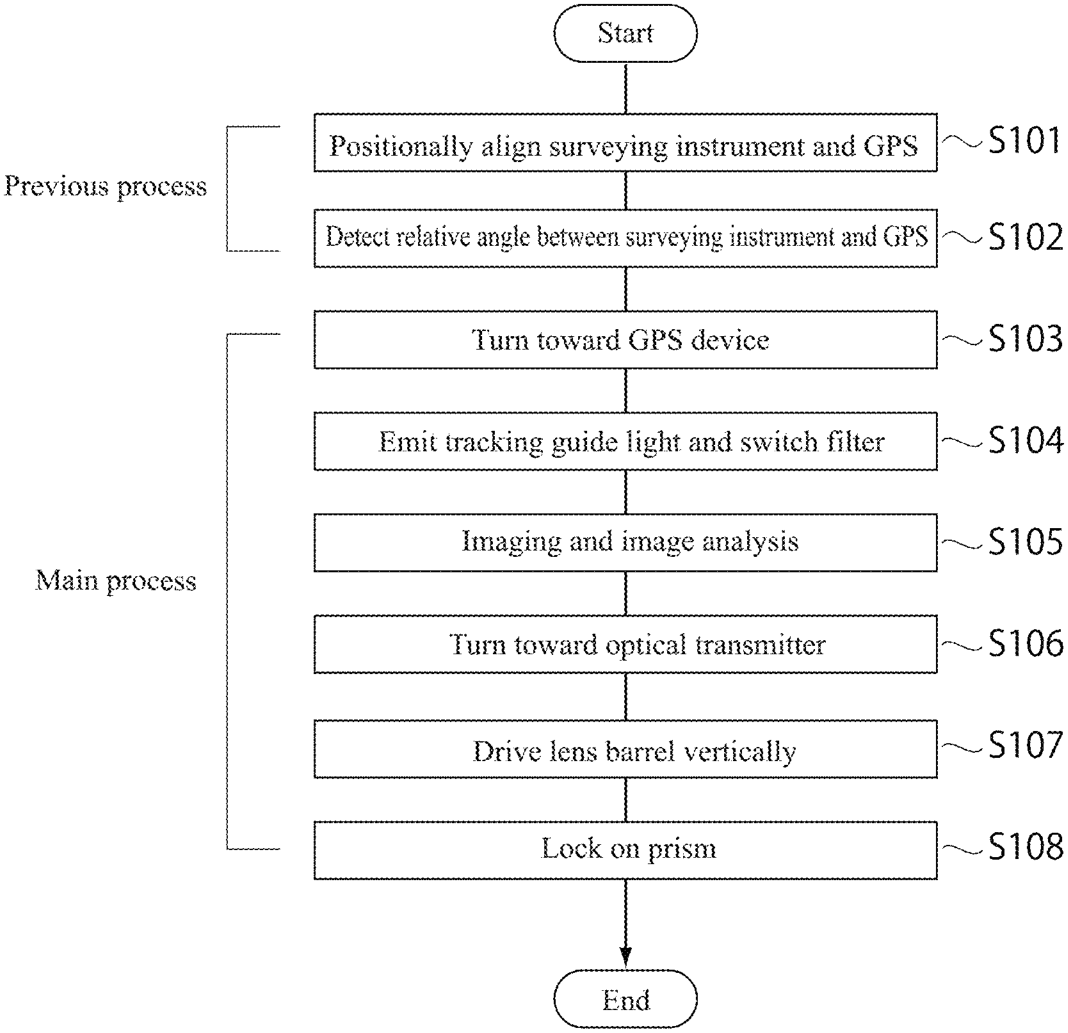
Figure 13:
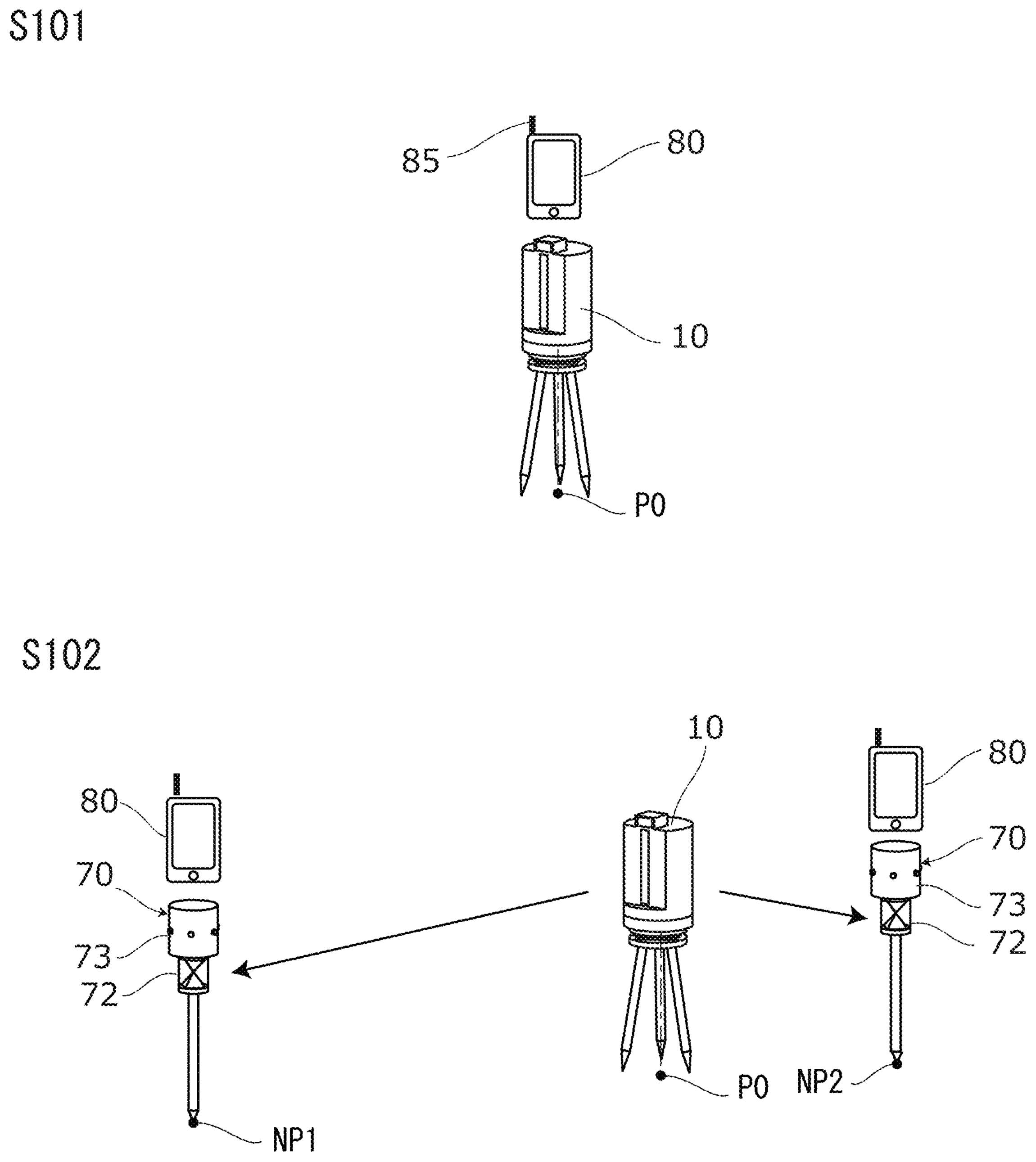
Figure 14:
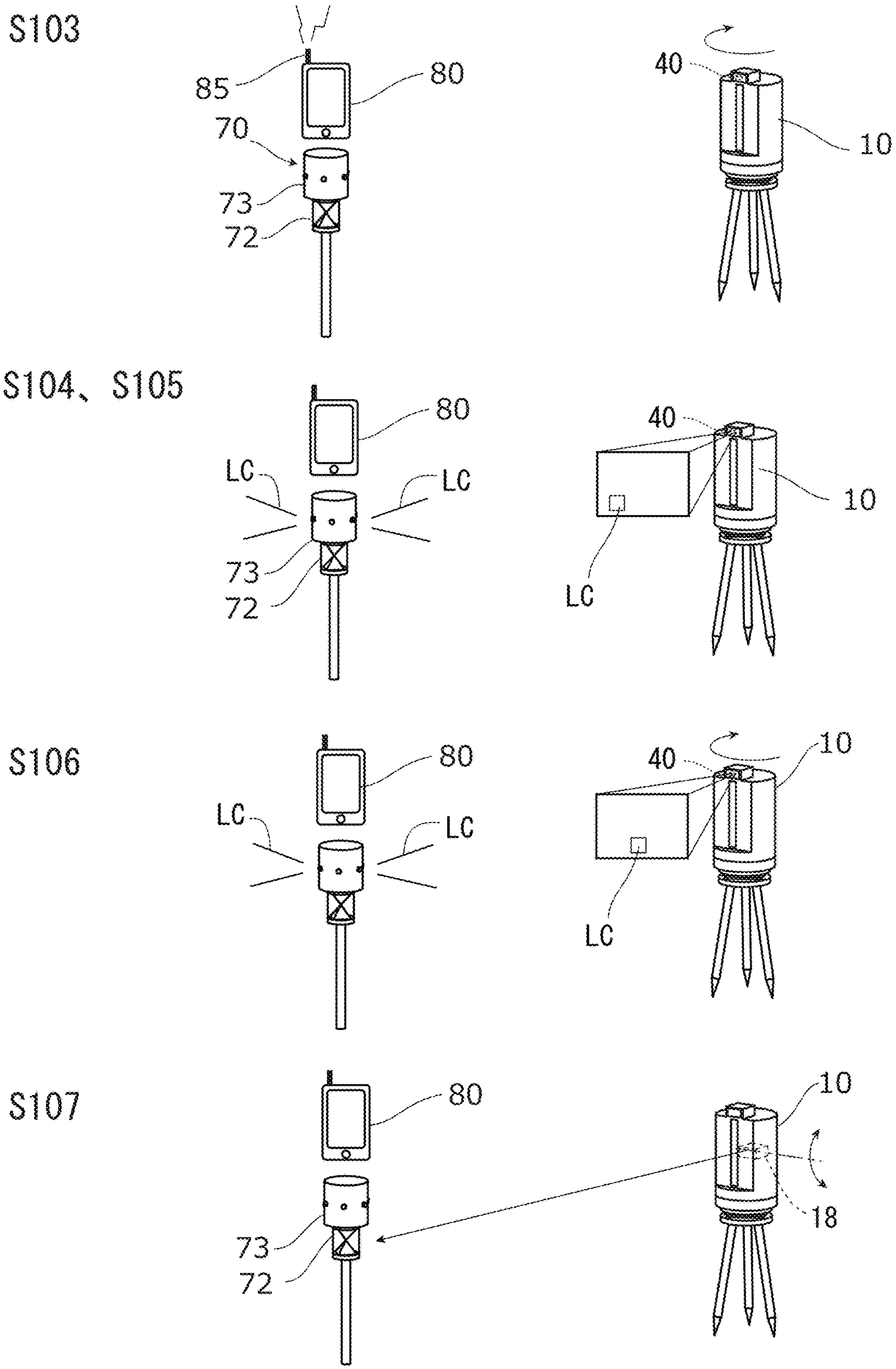

A flow of prism lock-on in the survey system 1 will be described with reference to FIGS. 12 to 14. FIG. 12 is a flowchart of prism lock-on. FIG. 13 is an image view of Steps S101 and S102. FIG. 14 is an image view of Steps S103 to S107.

First, in Step S101, as a previous process, the surveying instrument 10 is installed at an arbitrary point P0 (preferably, known point), and then, the controller 80 and the surveying instrument 10 are positionally aligned with each other. On the surveying instrument 10, an installation position of the controller 80 may be provided for positioning. By the GPS device 85, a latitude and a longitude of the controller 80 are acquired, and a latitude and a longitude of the installation position of the surveying instrument 10 are also acquired.

Next, the processing shifts to Step S102, and it is made possible to acquire a relative direction between the surveying instrument 10 and the controller 80. The operator holds the controller 80 and the target unit 70 and moves to an arbitrary location NP1 at some distance, and at this location, acquires a latitude and a longitude by the GPS device 85, and causes the surveying instrument 10 to make distance and angle measurements of the prism 72. The operator further moves to a different arbitrary location NP2 and acquires a latitude and a longitude again by the GPS device 85, and causes the surveying instrument 10 to make distance and angle measurements of the prism 72. At this time, the distance and angle measurements may be made by attaching the controller 80 onto an upper surface of the target unit 70. From azimuths of the two locations NP1 and NP2, a direction of the controller 80 (relative direction) viewed from the surveying instrument 10 is grasped. Without limitation to this method, a configuration may be made in which the prism 72 of the target unit 70 held by the operator is tracked, and by performing distance and angle measurements as needed while the operator moves, calibration is performed so that the surveying instrument 10 can detect the relative direction of the controller 80. In addition, absolute three-dimensional coordinates may be acquired by using a backward intersection method in which the surveying instrument 10 is installed at a known point, and a reference point and a reference direction are set.

Steps S101 and S102 of the previous process are for causing the surveying instrument 10 to grasp a direction of the operator holding the prism 72 and the controller 80 with rough accuracy. Therefore, position information of the GPS device 85 may be acquired by single positioning (independent GPS positioning), and does not have to be acquired by detection of an exact relative direction by acquiring highly accurate three-dimensional information.

The operator moves with the target unit 70 and the controller 80 during a work. GPS signal acquisition of the GPS device 85 is performed as needed during the movement, so that even after or while the operator moves, an azimuth of the controller 80 with respect to the surveying instrument 10 is generally grasped as long as a GPS signal can be acquired.

Next, as a main process, in Steps S103 to S108, prism lock-on for starting tracking by the tracking unit 24 or restarting tracking when tracking is lost will be described.

In Step S103, first, based on position information of the GPS device 85, the lens barrel unit 18 of the surveying instrument 10 is directed toward the direction of the GPS device 85, that is, a direction of the operator holding the target unit 70 and the controller 80. A difference between a current horizontal direction angle and a calculated azimuth of the GPS device 85 is calculated as an angle, and by driving the horizontal rotation driving unit M1, the rotary base 14 is turned in the horizontal direction.

Next, the processing shifts to Step S104, and the optical transmitter 73 is caused to transmit tracking guide light Lc. By the filter switching device 42, filter switching is made so that the second filter 43*b* as a tracking guide light filter is disposed on the optical axis of the imaging device 41.

Next, the processing shifts to Step S105, and an image in front of the surveying instrument 10 is acquired by the imaging device 41 through the second filter 43*b*. The surveying instrument control unit 29 analyzes the acquired image and detects the tracking guide light Lc.

Next, the processing shifts to Step S106, and the surveying instrument control unit 29 calculates an arrival direction of the tracking guide light Lc by image analysis, and drives the horizontal rotation driving unit M1 to align a center of the imaged image and the arrival direction of the tracking guide light Lc in the horizontal direction.

Next, the processing shifts to Step S107, and by driving the lens barrel unit 18 in the up-down direction by the vertical rotation driving unit M2, scanning in the up-down direction is performed by the tracking light of the tracking unit 24 to find the prism 72. At this time, the arrival direction of the tracking guide light Lc is also grasped in the vertical direction by the above-described image analysis, so that a range in the vertical direction is also narrowed, and a configuration for more easily finding the prism is made.

Next, the processing shifts to Step S108, the prism 72 is locked on, the optical transmitter 73 stops light transmission, the filter switching device 42 changes the disposed filter back to the first filter 43*a*, and the flow ends.

When tracking is lost, a notification of this is transmitted from the surveying instrument 10 to the optical transmitter 73, and the optical transmitter 73 immediately performs the main process of prism lock-on.

By performing Step S103, the surveying instrument 10 is directed toward a rough direction in the horizontal direction, and by detecting the tracking guide light Lc by the imaging unit 40 with a wide angle of view in Step S104, the surveying instrument 10 is directed toward an accurate direction in the horizontal direction. Then, by performing scanning in the up-down direction by the tracking light of the tracking unit 24, the prism 72 is searched for and locked on.

Conventionally, the prism can be locked on by scanning in all directions by the tracking light even in a state where there is no clue, however, this takes time. By using the above-described method, the lens barrel unit 18 can be directed toward a rough direction and an accurate direction of the prism 72 in order, so that the time to be taken until lock-on of the prism 72 can be shortened.

In addition, by performing imaging by transmitting only the tracking guide light Lc by using the filter switching device 42 of the imaging unit 40, even when the sun enters the field of view of the imaging device 41, the tracking guide light Lc can be detected while influences of the sunlight are suppressed. The same applies during tracking, and when the sunlight enters during tracking, by switching the filter of the imaging unit 40 to the second filter 43*b*, tracking of the prism 72 can be prevented from being lost due to entrance of the sunlight. The operator confirms a landscape in front of the surveying instrument 10 by the imaging unit 40, so that a configuration may be made in which as light more than an acceptable amount enters the imaging device 41, the filter is automatically switched to the second filter 43*b* even when tracking is not performed.

When tracking is lost, a notification of this is displayed on the display unit 82, and the above-described Steps S103 to S108 are automatically performed.

In a conventional surveying instrument, scanning is performed by emitting tracking light by a light transmitting unit of a tracking unit and receiving reflected light by a light receiving unit. In this case, light received by the light receiving unit is reflected light, so that the amount of light received is small. The surveying instrument 10 receives the tracking guide light Lc transmitted from the target side by the imaging unit 40 that is a wide camera, so that the amount of light received is large and detection is easy. Therefore, the prism 72 can be more quickly locked on.

(Work Flow)

Figure 15:
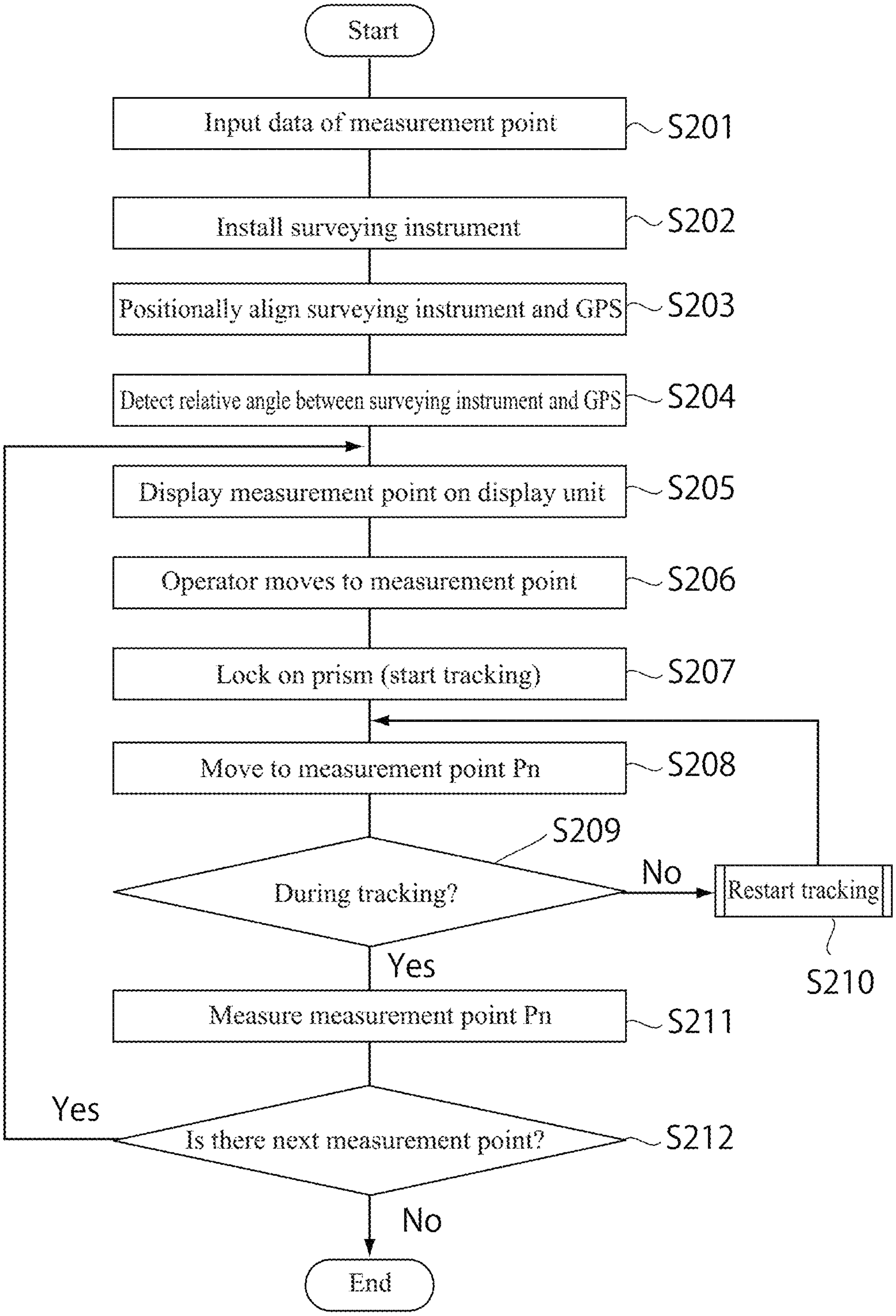
FIG. 15 illustrates a flow of a survey work.

An example of a work process flow of the survey system 1 will be described. FIG. 15 is a process flow of a survey work using the survey system 1. Refer to FIG. 11 as well.

First, in Step S201, as preprocessing, information on a survey site including CAD data and measurement point data, etc., is input into the controller 80. The input information is stored in the storage unit 83 of the controller 80.

Next, the processing shifts to Step S202, the surveying instrument 10 is installed at a known point, and three-dimensional coordinates are acquired by a backward intersection method, etc.

Next, in Step S203, the controller 80 and the surveying instrument 10 are positionally aligned with each other. Step S203 corresponds to Step S101 described above.

Next, the processing shifts to Step S204, and it is made possible to acquire a relative direction between the surveying instrument 10 and the controller 80. Step S204 corresponds to Step S102 described above.

Next, the processing shifts to Step S205, and position information of the measurement points P1, P2, P2 . . . Pn is operated, a survey setting map corresponding to input data is displayed on the display unit 82, and position information of a measurement point Pn that should be measured is displayed on the display unit 82.

Next, the processing shifts to Step S206, and the surveying instrument 10 drives the horizontal rotation driving unit M1 to direct the lens barrel unit 18 toward the direction of the measurement point Pn. The operator moves toward the measurement point Pn while confirming the survey setting map on the display unit 82. During this, the surveying instrument 10 drives the lens barrel unit 18 in the up-down direction to perform scanning by the tracking light.

Next, the processing shifts to Step S207, and when the operator arrives at a position on a line connecting the measurement point Pn and the surveying instrument 10, the tracking unit 24 locks on the prism 72 and starts tracking.

Next, the processing shifts to Step S208, and the operator moves to the measurement point Pn while confirming a detailed distance to the measurement point Pn obtained by tracking on the display unit 82.

Next, the processing shifts to Step S209, and when tracking is lost during the movement in Step S107, a tracking restarting flow is entered as Step S210. Specifically, Steps S103 to S108 as a main process of prism lock-on are performed, and the prism 72 is locked on and tracking is restarted. As tracking is restarted, the processing returns to Step S208. When the operator arrives at the measurement point Pn while being tracked, the processing shifts to Step S210.

Next, the processing shifts to Step S211, and when the operator arrives at the measurement point Pn, the target unit 70 is placed substantially vertically on the measurement point Pn, and the surveying instrument 10 measures a distance and angles of the prism 72 placed on the measurement point Pn.

Next, the processing shifts to Step S212, and when there is a next measurement point Pn+1, the processing shifts to Step S205, and for the next measurement point Pn+1, Steps S205 to S211 are repeated. When there is no next measurement point, the survey ends.

(Modification 1)

Figure 16:
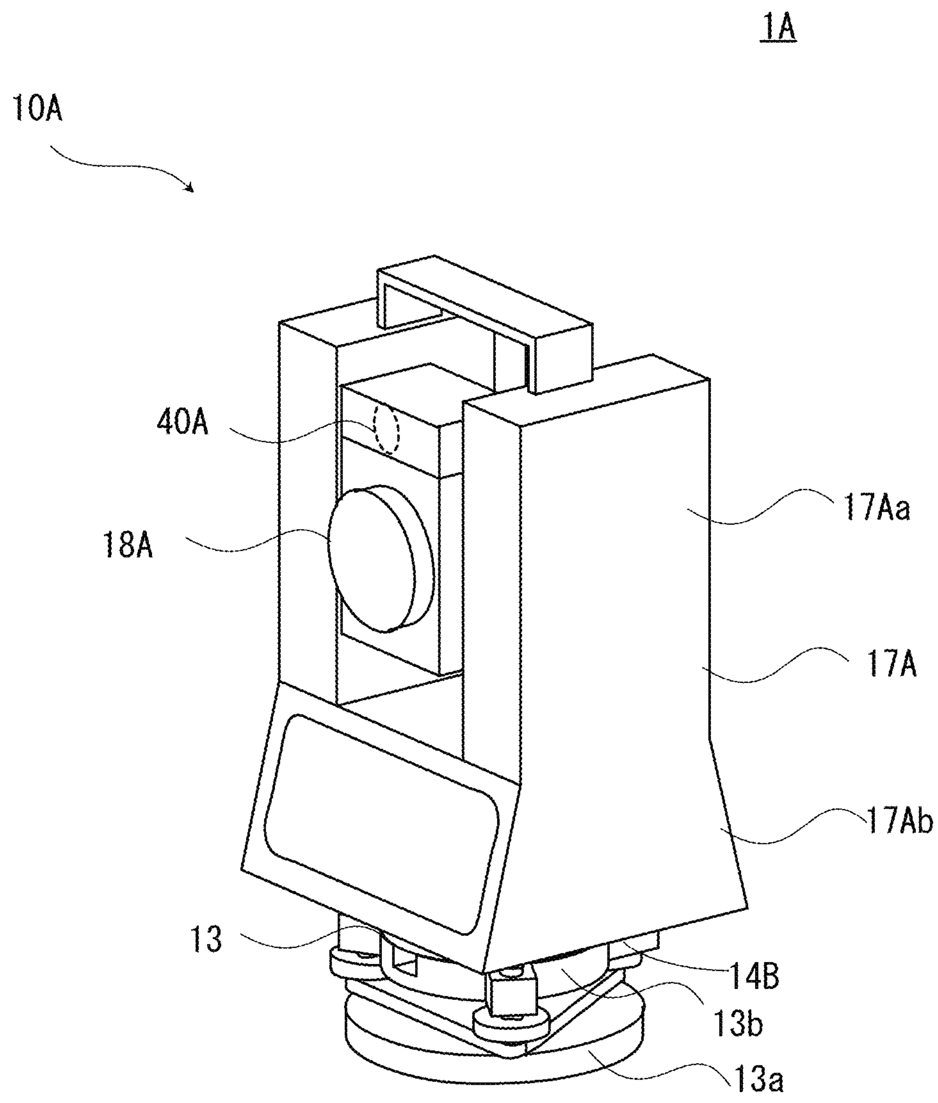
FIG. 16 is a perspective view of a surveying instrument according to a modification.
Figure 17:
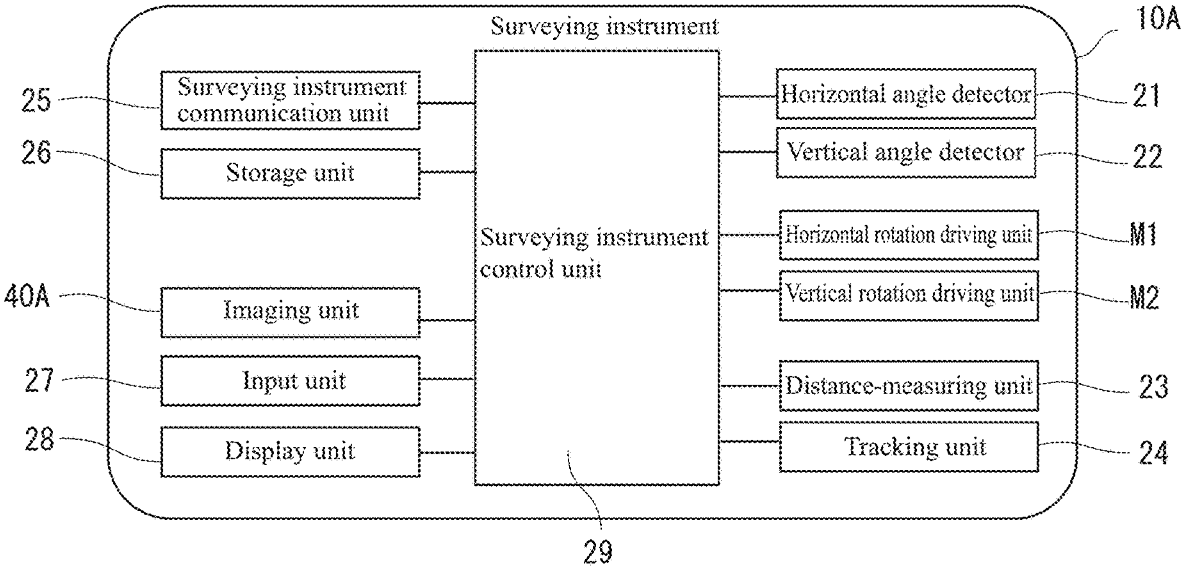
FIG. 17 is a block diagram of the surveying instrument according to the modification.

FIG. 16 is a schematic external perspective view of a surveying instrument 10A constituting a survey system 1A according to a modification. FIG. 17 is a configuration block diagram of the surveying instrument 10A. The survey system 1A has the same configuration except for including the surveying instrument 10A in place of the surveying instrument 10, so that detailed overall description is omitted. The surveying instrument 10A has a configuration functionally equivalent to that of the surveying instrument 10, but has the following differences in appearance. The surveying instrument 10A does not include the cover member 16. In addition, a bracket portion 17A fixed onto the rotary base 14 provided on the base portion 13 and rotatable in the horizontal direction includes an independent casing having a U shape open upward.

A lower portion 17Ab of the bracket portion 17A has a horizontally-long rectangular parallelepiped shape, and includes, on a front surface, an input unit 27 for directly operating the surveying instrument 10A and a display unit 28. The upper portion 17Ac of the bracket portion 17A extends upward as a pair of left and right columns, and between the columns, a telescope 18A is supported in a vertically rotatable manner around a horizontal shaft H. On an upper portion of the telescope 18A, an imaging unit 40A having a configuration equivalent to that of the imaging unit 40 is provided.

That is, as a main difference between the surveying instrument 10 and the surveying instrument 10A, the imaging unit 40 is provided at an upper end of the bracket portion 17 and rotates only in the horizontal direction in the surveying instrument 10, and on the other hand, in the surveying instrument 10A, the imaging unit 40A is provided on an upper portion of the telescope 18A and rotatable in the horizontal direction and the vertical direction together with the telescope 18A.

On the other hand, as illustrated in FIG. 17, the surveying instrument 10 and the surveying instrument 10A have functionally equivalent configurations except that the surveying instrument 10A includes the input unit 27 and the display unit 28.

Figure 18:
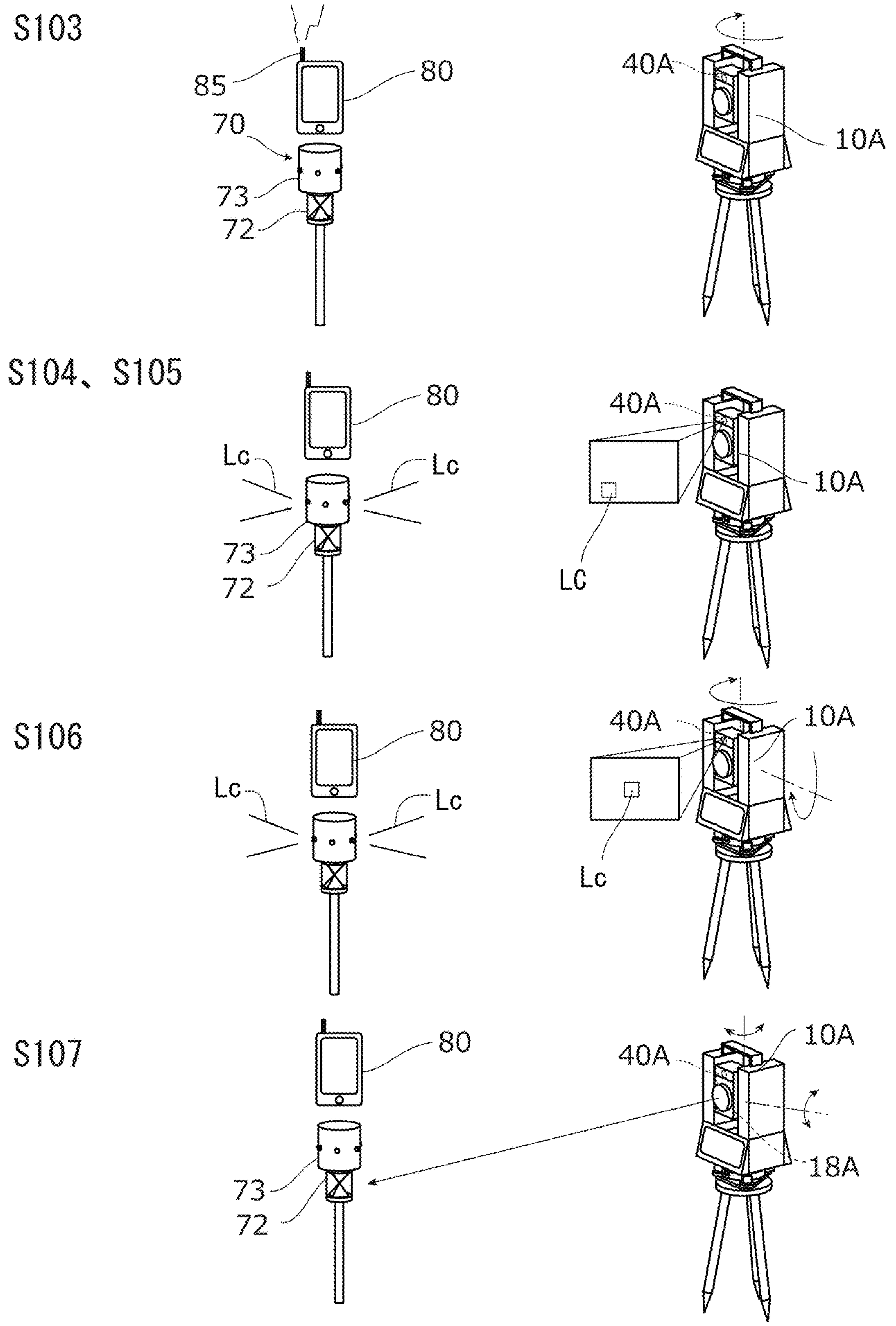
FIG. 18 is an image view of a main process of prism lock-on using the surveying instrument according to the modification. This corresponds to FIG. 14.

A flow of prism lock-on using the survey system 1A is substantially the same as the flow illustrated in FIG. 12. Based on the differences in configuration described above, operations in Steps S106 and S107 of the main process are different as illustrated in FIG. 18. That is, in Step S106, the surveying instrument control unit 29 calculates an arrival direction of the tracking guide light Lc based on a result of the image analysis, drives the horizontal rotation driving unit M1 and the vertical rotation driving unit M2 to rotate the telescope 18A, and directs a collimation axis of the telescope 18A toward the arrival direction of the tracking guide light Lc (accurate direction of the prism 72). By calculating the arrival direction of the tracking guide light Lc, not only a horizontal angle but also a vertical angle by which the telescope should be rotated can be grasped.

Therefore, in Step S107, when scanning is performed by the tracking light of the tracking unit 24 to capture the prism 72, just by slightly scanning the periphery of a current collimation direction in the vertical direction and the horizontal direction, the prism 72 can be captured.

As described above, in the surveying instrument 10A including the imaging unit 40 that is rotatable together with the telescope 18A, the telescope 18A is rotated in the horizontal direction and the vertical direction at the same time and directed toward the direction of the prism 72 with high accuracy, so that the telescope can more quickly capture the prism.

(Modification 2)

Figure 19A:
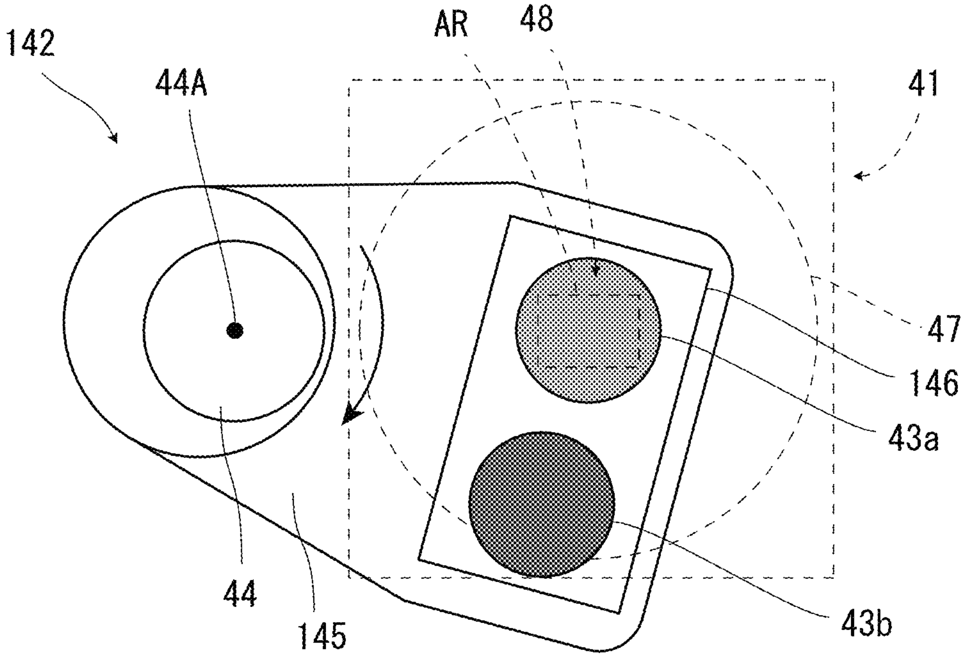
FIGS. 19A and 19B are front views of a filter switching device according to a modification.
Figure 19B:
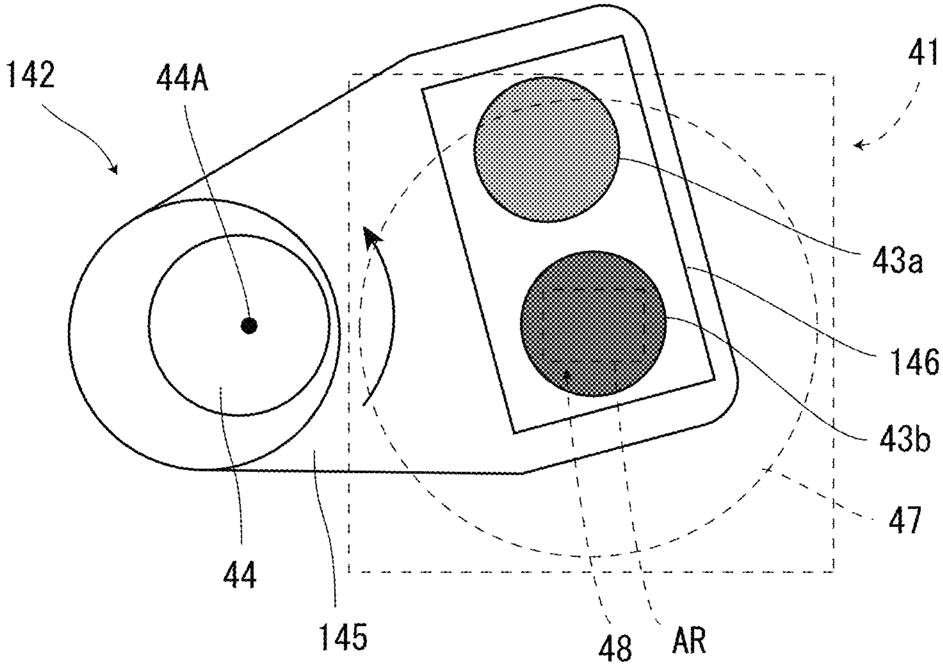

FIGS. 19A and 19B illustrate a filter switching device 142 as a modification of the filter switching device 42.

In the filter switching device 42, the first filter 43*a* and the second filter 43*b* are attached to two openings formed in the base body 45. On the other hand, in the filter switching device 142, a common substrate 146 on which both of the first 43*a* and the second filter 43*b* are provided is attached to a formed opening. The filter switching device 142 has a configuration equivalent to that of the filter switching device 42 except that a base body 145 is used in place of the base body 45.

The common substrate 146 is a flat plate with a uniform thickness made of a member having properties of transmitting light, such as a translucent resin member or a glass material, and on its surface, the first filter 43*a* and the second filter 43*b* that are film-shaped are provided.

As with the base body 45, the base body 145 is joined to the solenoid 44 and supported turnably, and the first filter 43*a* and the second filter 43*b* are selectively disposed on the optical axis of the imaging device 41 according to turning of the base body 145. In a state where the solenoid 44 is not energized, the first filter 43*a* is disposed on the optical axis of the imaging device 41 in front of the light receiving element AR so as to cover the light receiving element AR (refer to FIG. 19A). By energizing the solenoid 44, the base body 145 joined to the solenoid 44 is driven and rotated by a predetermined angle around a central axis 44A, and accordingly, the filter to be disposed on the optical axis of the imaging device 41 is switched to the second filter 43*b* (refer to FIG. 19B).

Figure 20A:
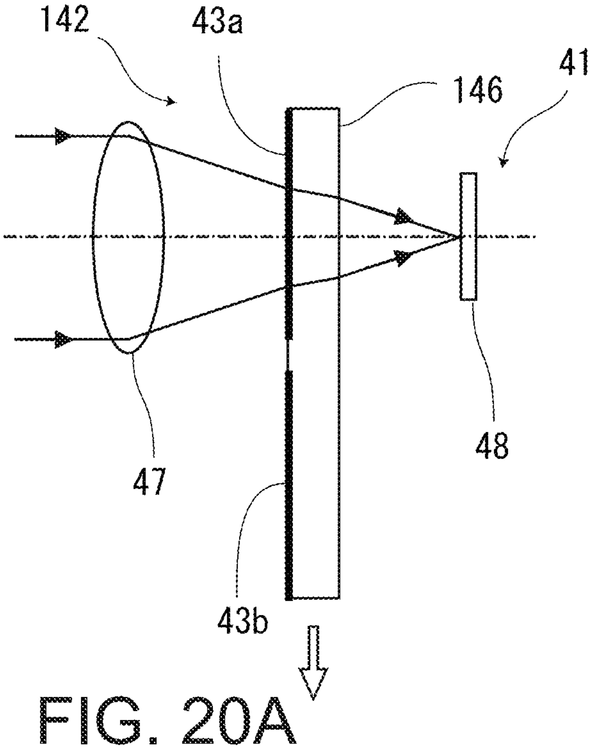
FIGS. 20A and 20B illustrate optical paths of incident lights in the filter switching device according to the modification.
Figure 20B:
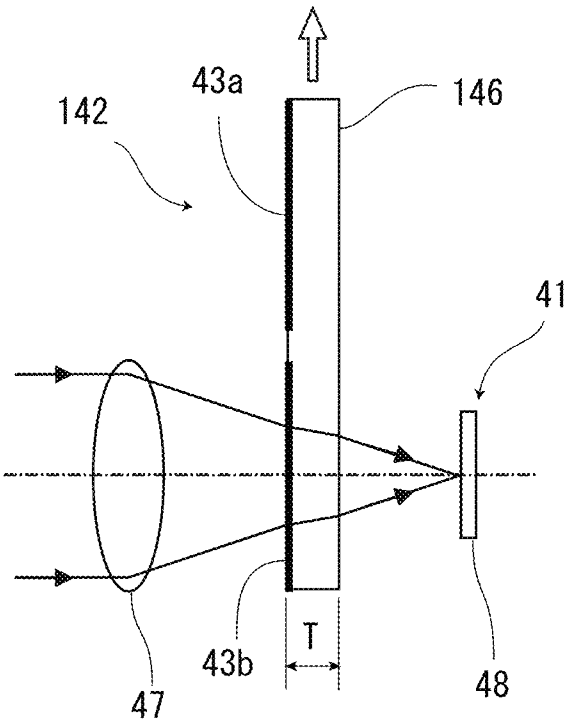

FIGS. 20A and 20B are optical diagrams illustrating optical paths of incident light on the filter switching device 142. FIG. 20A illustrates a state where the first filter 43*a* is disposed on the optical axis of the imaging device 41, and FIG. 20B illustrates a state where the second filter 43*b* is disposed on the optical axis of the imaging device 41.

The imaging device 41 includes an imaging lens 47, and an image sensor 48 including the light receiving element AR. The base body 145 is disposed turnably (movably) between the imaging lens 47 and the image sensor 48 on an optical axis of the imaging lens 47. According to turning of the base body 145, the common substrate 46 moves in the up-down direction, and the first filter 43*a* and the second filter 43*b* provided on the common substrate 46 are selectively disposed on the optical axis of the imaging lens 47. Light incident on the imaging device 41 passes through the imaging lens 47, passes through the first filter 43*a* or the second filter 43*b*, and is condensed to the image sensor 48.

The first filter 43*a* and the second filter 43*b* are configured as extremely thin films as compared with the common substrate 46 with a thickness T, and the thicknesses of the films are as small as being negligible without any problem. As illustrated in FIG. 20A, when the first filter 43*a* is disposed on the optical axis of the imaging lens 47, light incident on the imaging device 41 passes through the common substrate 46 with the thickness T and is condensed to the image sensor 48. As illustrated in FIG. 20B, when the base body 145 is turned by the solenoid 44, the common substrate 46 moves, and the second filter 43*b* is disposed on the optical axis of the imaging lens 47, and light incident on the imaging device 41 passes through the common substrate 46 with the thickness T and is condensed to the image sensor 48. Regardless of which of the filters is disposed on the optical axis of the imaging lens 47, light incident on the imaging device 41 passes through the common substrate 46 with the thickness T, so that even when the filter is switched, imaging can be performed in the same light condensing state, that is, the same focusing state in the image sensor 48.

In a case where the first filter 43*a* and the second filter 43*b* are provided on different substrates, due to a difference in thickness or disposition of the substrates themselves, when the optical path length from the imaging lens 47 to the image sensor 48 differs according to filter switching, focusing is performed. On the other hand, by providing the first filter 43*a* and the second filter 43*b* on the same substrate (common substrate 146), the optical path lengths of the incident lights can be made the same, so that focusing in response to filter switching is unnecessary.

A preferred embodiment and modifications of the present invention have been described above, and the above-described embodiment and modifications are just examples of the present invention, and these can be combined based on knowledge of a person skilled in the art, and such a combined embodiment is also included in the scope of the present invention.

REFERENCE SIGNS LIST

1: Survey system
10: Surveying instrument
17: Bracket portion
18: Lens barrel unit
24: Tracking unit
40: Imaging unit
41: Imaging device
42: Filter switching device
43*a*: First filter
43*b*: Second filter
70: Target unit
72: Prism
73: Optical transmitter
146: Common substrate
L2: Optical axis
M1: Horizontal rotation driving unit
M2: Vertical rotation driving unit
H: Horizontal shaft
V: Vertical axis

The invention claimed is:

1. A surveying instrument comprising:

a lens barrel storing optical systems of a tracking unit and a distance-measuring unit;

a motor configured to drive and rotate the lens barrel;

an image sensor configured to image an image in front of the lens barrel;

an actuator configured to switch filters so that either of two filters is selectively disposed on an optical axis of the image sensor; and a microcontroller configured to, when the image sensor acquires an image including tracking guide light transmitted from an optical transmitter, analyze the image and operate an arrival direction of the tracking guide light, and control the motor so that a collimation axis of the lens barrel is directed toward the arrival direction of the tracking guide light, wherein one filter of the two filters is a tracking guide light filter configured to transmit only wavelengths in a predetermined range centered on a wavelength of the tracking guide light, and the actuator disposes the tracking guide light filter on the optical axis of the image sensor when the image sensor acquires the image.

2. The surveying instrument according to claim 1, wherein the tracking guide light is nonvisible light, and the one filter of the two filters is a filter for transmitting only nonvisible light, and the other filter is a filter for transmitting only visible light.

3. The surveying instrument according to claim 1, wherein during tracking of a target by the tracking unit, when the target is lost, the actuator automatically disposes the tracking guide light filter on the optical axis of the image sensor.

4. The surveying instrument according to claim 2, wherein during tracking of a target by the tracking unit, when the target is lost, the actuator automatically disposes the tracking guide light filter on the optical axis of the image sensor.

5. The surveying instrument according to claim 1, wherein during imaging by the image sensor, when the number of saturated pixels included in an acquired image exceeds a predetermined number, the actuator disposes the tracking guide light filter on the optical axis of the image sensor.

6. The surveying instrument according to claim 2, wherein during imaging by the image sensor, when the number of saturated pixels included in an acquired image exceeds a predetermined number, the actuator disposes the tracking guide light filter on the optical axis of the image sensor.

7. The surveying instrument according to claim 1, wherein the two filters are provided on the same substrate.

8. The surveying instrument according to claim 2, wherein the two filters are provided on the same substrate.

9. A survey system comprising:

a target unit including an optical transmitter configured to transmit tracking guide light, and a prism; and a surveying instrument including a lens barrel storing optical systems of a tracking unit and a distance-measuring unit, a motor configured to drive and rotate the lens barrel, an image sensor configured to acquire an image of a landscape in front of the lens barrel, an actuator configured to switch filters so that either of two filters is selectively disposed on an optical axis of the image sensor, and a microcontroller configured to analyze an image including the tracking guide light transmitted from the optical transmitter, imaged by the image sensor, operate an arrival direction of the tracking guide light, and control the motor so that a collimation axis of the lens barrel is directed toward the arrival direction of the tracking guide light, wherein one filter of the two filters is a tracking guide light filter configured to transmit only wavelengths in a predetermined range centered on a wavelength of the tracking guide light, and the actuator disposes the tracking guide light filter on the optical axis of the image sensor when the image sensor acquires an image.

10. The survey system according to claim 9, wherein the tracking guide light is nonvisible light, and the one filter of the two filters is a filter for transmitting only nonvisible light, and the other filter is a filter for transmitting only visible light.

11. The survey system according to claim 9, wherein during tracking of a target by the tracking unit, when the target is lost, the actuator automatically disposes the tracking guide light filter on the optical axis of the image sensor.

12. The survey system according to claim 9, wherein during imaging by the image sensor, when the number of saturated pixels included in an acquired image exceeds a predetermined number, the actuator disposes the tracking guide light filter on the optical axis of the image sensor.

13. The survey system according to claim 9, wherein the two filters are provided on the same substrate.

* * * * *